United States Patent
Tu et al.

(10) Patent No.: US 9,219,893 B2
(45) Date of Patent: *Dec. 22, 2015

(54) METHOD FOR CORRECTING PIXEL INFORMATION OF COLOR PIXELS ON A COLOR FILTER ARRAY OF AN IMAGE SENSOR

(71) Applicant: VisEra Technologies Company Limited, Hsinchu (TW)

(72) Inventors: Zong-Ru Tu, Keelung (TW); Wu-Cheng Kuo, Hsinchu (TW); Chin-Chuan Hsieh, Hsinchu (TW); Yu-Kun Hsiao, Hsinchu (TW)

(73) Assignee: VisEra Technologies Company Limited, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,475

(22) Filed: Aug. 22, 2014

(65) Prior Publication Data

US 2014/0362250 A1 Dec. 11, 2014

Related U.S. Application Data

(63) Continuation of application No. 13/730,475, filed on Dec. 28, 2012, now Pat. No. 8,866,944.

(51) Int. Cl.
H04N 9/04 (2006.01)
H04N 9/07 (2006.01)

(52) U.S. Cl.
CPC ............... *H04N 9/045* (2013.01); *H04N 9/07* (2013.01); *H04N 2209/046* (2013.01)

(58) Field of Classification Search
CPC .... H04N 9/045; H04N 9/07; H04N 2209/046
USPC .................................................. 348/278, 279
See application file for complete search history.

(56) References Cited

U.S. PATENT DOCUMENTS

| 7,990,447 B2 | 8/2011 | Honda et al. |
| 8,045,033 B2 | 10/2011 | Honda et al. |
| 8,619,163 B2 | 12/2013 | Ogura et al. |
| 2006/0119738 A1 | 6/2006 | Kido |
| 2007/0268533 A1 | 11/2007 | Kijima et al. |
| 2008/0218597 A1 | 9/2008 | Cho |

(Continued)

FOREIGN PATENT DOCUMENTS

| JP | 2006-165975 A | 6/2006 |
| JP | 2008-219598 A | 9/2008 |

(Continued)

*Primary Examiner* — Nhan T Tran
*Assistant Examiner* — Chan Nguyen
(74) *Attorney, Agent, or Firm* — Birch, Stewart, Kolasch & Birch, LLP

(57) ABSTRACT

A method for correcting pixel information of color pixels on a color filter array of an image sensor includes: establishing an M×M distance factor table, selecting M×M pixels of the color filter array, calculating a red/green/blue-color contribution from the red/green/blue pixels to a target pixel in the selected M×M pixels, calculating a red/blue/green-color pixel performance of the target pixel, calculating a red/blue/green-color correcting factor, obtaining a corrected pixel information of each of the red/green/blue pixels, by applying the red/green/blue-color correcting factor to the measured pixel information of each of the red/green/blue pixels.

20 Claims, 26 Drawing Sheets

(56) References Cited

U.S. PATENT DOCUMENTS

| | | |
|---|---|---|
| 2010/0231770 A1 | 9/2010 | Honda et al. |
| 2012/0307104 A1 | 12/2012 | Kanai et al. |
| 2014/0055649 A1 | 2/2014 | Hiramoto et al. |
| 2014/0240567 A1 | 8/2014 | Saito et al. |
| 2015/0009368 A1* | 1/2015 | Nonaka et al. ................ 348/242 |

FOREIGN PATENT DOCUMENTS

| | | |
|---|---|---|
| JP | 2009-538563 A | 11/2009 |
| WO | WO 2011/048870 A1 | 4/2011 |

* cited by examiner

| | R | 1 | 2 | G³ | R⁴ | 3 | 2 | G¹ | R | | | G |
|---|---|---|---|---|---|---|---|---|---|---|---|---|
| | | 2 | 4 | 6 | 8 | 6 | 4 | 2 | | | | |
| | | 3 | 6 | 9 | 12 | 9 | 6 | 3 | | | | |
| $G_{59} \times d_{TTP} = 235\ lux \times 6/16$ | G | 4 | 8 | B¹² | G¹⁶ | 12 | 8 | B⁴ | G | | | B |
| | R | 3 | 6 | G⁹ | R¹² | 9 | 6 | G³ | R | | | G |
| | | 2 | 4 | 6 | TP⁶ | 4 | 2 | | | | | |
| | | 1 | 2 | 3 | 4 | 3 | 2 | 1 | | | | |
| | G | | | B | G | | | B | G | | | B |
| | R | | | G | R | | | G | R | | | G |
| | | | | | | | | | | | | |
| | | | | | | | | | | | | |
| | G | | | B | G | | | B | G | | | B |

| | | | | | | | | | | | |
|---|---|---|---|---|---|---|---|---|---|---|---|
| R | | | G | R | | | G | R | | | G |
| | | | | | | | | | | | |
| | | | | | | | | | | | |
| G | | | B | G | | | B | G | | | B |
| R | | | G | R | 1 | 2 | G³ | R⁴ | 3 | 2 | G¹ |
| | | | | | TP² | 4 | 6 | 8 | 6 | 4 | 2 |
| | | | | | 3 | 6 | 9 | 12 | 9 | 6 | 3 |
| G | | | B | G | 4 | 8 | B¹² | G¹⁶ | 12 | 8 | B⁴ |
| R | | | G | R | 3 | 6 | G⁹ | R¹² | 9 | 6 | G³ |
| | | | | | 2 | 4 | 6 | 8 | 6 | 4 | 2 |
| | | | | | 1 | 2 | 3 | 4 | 3 | 2 | 1 |
| G | | | B | G | | | B | G | | | B |

$G_{95} \times d_{fTP} = 235 \text{ lux} \times 2/16$

METHOD FOR CORRECTING PIXEL INFORMATION OF COLOR PIXELS ON A COLOR FILTER ARRAY OF AN IMAGE SENSOR

CROSS-REFERENCE TO RELATED APPLICATIONS

This application is a Continuation of co-pending application Ser. No. 13/730,475 filed on Dec. 28, 2012. The entire contents of this application are hereby incorporated by reference.

BACKGROUND OF THE INVENTION

1. Field of the Invention

The present invention relates to a color filter array of an image sensor, and more particularly to a method for correcting pixel information of color pixels on a color filter array of an image sensor.

2. Background of the Invention:

CMOS Image Sensor (CIS) is an imaging device that performs the role of an electronic film in digital photography equipment. CIS has been used in a broad range of areas including digital cameras, camera phone, web-camera, notebook security devices, automobile, and miniature imaging devices used in medical applications. To achieve high image sensing quality, it is necessary for the CIS to provide wide dynamic range and high sensibility.

A CIS includes a color filter array, a micro lens array and pixel sensors (e.g., a photo diodes). A color filter array is a mosaic of tiny color filters placed over the pixel sensors of the image sensor to capture color information. A Bayer filter array is a typical color filter array for arranging RGB (red, green, blue) color filters on a square grid of photo diodes.

In order to increase the image sensibility of the CIS, a plurality of possible color filter arrays with WRGB (white, red, green, blue) arrangement have been proposed. For example, Toshiba proposed a 1/4 WRGB color filter array having a plurality of pixel arrays. As shown in FIG. 1A, each pixel array consists of a four (4) 2×2 pixel units, and each 2×2 pixel unit has one (1) white pixel, one (1) red pixel, one (1) green pixel and one (1) blue pixel.

After TSB proposed the 1/4 WRGB color filter array, Eastman Kodak Company proposed a 2/4 WRGB color filter array having a plurality of pixel arrays. As shown in FIG. 1B, each pixel array consists of a four (4) 2×2 pixel units, and each 2×2 pixel unit has two (2) white pixels and two (2) color pixels with the same color.

Since the 1/4 WRGB color filter array has one (1) white pixel in each pixel unit of the color filter array, the image sensitivity of the 1/4 WRGB color filter array is higher than a typical Bayer filter array. Similarly, since the 2/4 WRGB color filter array has two (2) white pixels in each pixel unit of the color filter array, the image sensitivity of the 2/4 WRGB color filter array is higher than a typical Bayer filter array and 1/4 WRGB color filter array. However, the image resolution of the CIS with the 2/4 WRGB color filter array will be reduced, also due to the increased number of white pixels in the 2/4 WRGB color filter array. Therefore, the more number of the white pixels in a color filter array, the higher the image sensitivity of the CIS and the lower the image resolution of the CIS.

SUMMARY OF THE INVENTION

In view of the above, how to provide an image sensor that can provide higher image sensibility without scarifying its image resolution becomes an important issue. To achieve the above-mentioned object, a method for correcting pixel information of color pixels on a color filter array of an image sensor is provided. The color filter array includes a plurality of pixel arrays. Each pixel array consists of a four (4) N×N pixel units, N being an integer equal to or larger than 2; each N×N pixel unit has a plurality of white pixels and at least one color pixel; the at least one color pixel includes one or more red pixels, one or more green pixels, one or more blue pixels, or any combination thereof, the number of the at least one color pixel in each of the four (4) N×N pixel units being the same; and the number of the at least one color pixel in each of the four (4) N×N pixel units is smaller than the number of the plurality of white pixels in each of the four (4) N×N pixel units. The method comprises: establishing an M×M distance factor table having M×M distance factors ($d_{fij}$); selecting M×M pixels of the color filter array, wherein the M×M pixels of the color filter array cover at least two red pixels, at least two green pixels, at least two blue pixels, and a target pixel, and the target pixel is a center pixel of the M×M pixels of the color filter array; calculating a red-color contribution ($R_{average}$) from the at least two red pixels to the target pixel in the M×M pixels of the color filter array by using the distance factors of the M×M distance factor table and measured pixel information ($R_{ij}$) of each of the at least two red pixels; calculating a green-color contribution ($G_{average}$) from the at least two green pixels to the target pixel in the M×M pixels of the color filter array by using the distance factors of the M×M distance factor table and measured pixel information ($G_{ij}$) of each of the at least two green pixels; calculating a blue-color contribution ($B_{average}$) from the at least two blue pixels to the target pixel in the M×M pixels of the color filter array by using the distance factors of the M×M distance factor table and measured pixel information ($B_{ij}$) of each of the at least two blue pixels; calculating at least one of a red-color pixel performance ($f_{Rij}$) of the target pixel, a green-color pixel performance ($f_{Gij}$) of the target pixel, and a blue-color pixel performance ($f_{Bij}$) of the target pixel, based on the red-color contribution ($R_{average}$), the green-color contribution ($G_{average}$) and the blue-color contribution ($B_{average}$), and measured pixel information (W) of the target pixel; calculating at least one of a red-color correcting factor ($T_R$) that is a ratio of the red-color pixel performance ($f_{Rij}$) to the red-color contribution ($R_{average}$), a green-color correcting factor ($T_G$) that is a ratio of the green-color pixel performance ($f_{Gij}$) to the green-color contribution ($G_{average}$), and a blue-color correcting factor ($T_B$) that is a ratio of the blue-color pixel performance ($f_{Bij}$) to the blue-color contribution ($B_{average}$); and performing at least one of obtaining a corrected pixel information ($R_{final}$) of each of the at least two red pixels, by applying the red-color correcting factor ($T_R$) to the measured pixel information ($R_{ij}$) of each of the at least two red pixels; obtaining a corrected pixel information ($G_{final}$) of each of the at least two green pixels, by applying the green-color correcting factor ($T_G$) to the measured pixel information ($G_{ij}$) of each of the at least two green pixels; and obtaining a corrected pixel information ($B_{final}$) of each of the at least two blue pixels, by applying the blue-color correcting factor ($T_B$) to the measured pixel information ($B_{ij}$) of each of the at least two blue pixels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 illustrates pixel arrays of several 3/4 WRGB color filter arrays in accordance with embodiments of the present invention;

FIGS. 6A-6P illustrate how a red-color contribution ($R_{average}$), a green-color contribution ($G_{average}$) and a blue-color contribution ($B_{average}$) in a 3/4 WRGB color filter array are calculated in accordance with an embodiment of the present invention; and FIGS. 7A-7C illustrate how a red-color contribution ($R_{average}$), a green-color contribution ($G_{average}$) and a blue-color contribution ($B_{average}$) in a 3/4 WRGB color filter array are calculated in accordance with another embodiment of the present invention.

DETAILED DESCRIPTION OF THE PREFERRED EMBODIMENTS

Figures 1A, 1B:
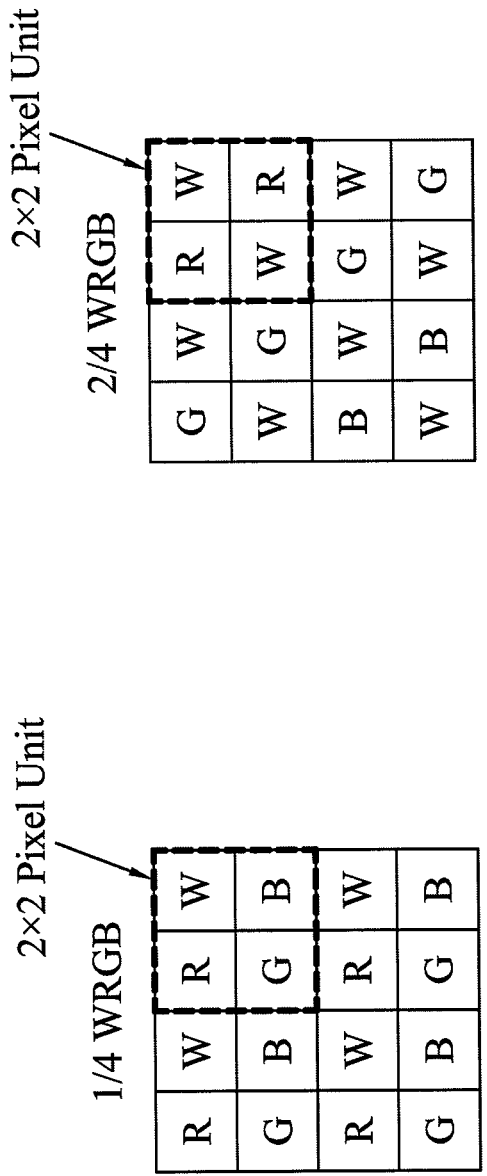
FIG. 1A illustrates a pixel array of a conventional 1/4 WRGB color filter array.
FIG. 1B illustrates a pixel array of a conventional 2/4 WRGB color filter array.

The present invention will now be described in detail with reference to the accompanying drawings, wherein the same reference numerals will be used to identify the same or similar elements throughout the several views. It should be noted that the drawings should be viewed in the direction of orientation of the reference numerals.

As embodied in the present invention, a color filter array of an image sensor includes a plurality of pixel arrays. Each pixel array consists of a four (4) N×N pixel units, N being an integer equal to or larger than 2. Each N×N pixel unit having a plurality of white pixels and at least one color pixel, the at least one color pixel including one or more red pixels, one or more green pixels, one or more blue pixels, or any combination thereof. The number of the at least one color pixel in each of the four (4) N×N pixel units is the same. The number of the at least one color pixel in each of the four (4) N×N pixel units is smaller than the number of the plurality of white pixels in each of the four (4) N×N pixel units.

Figure 2:
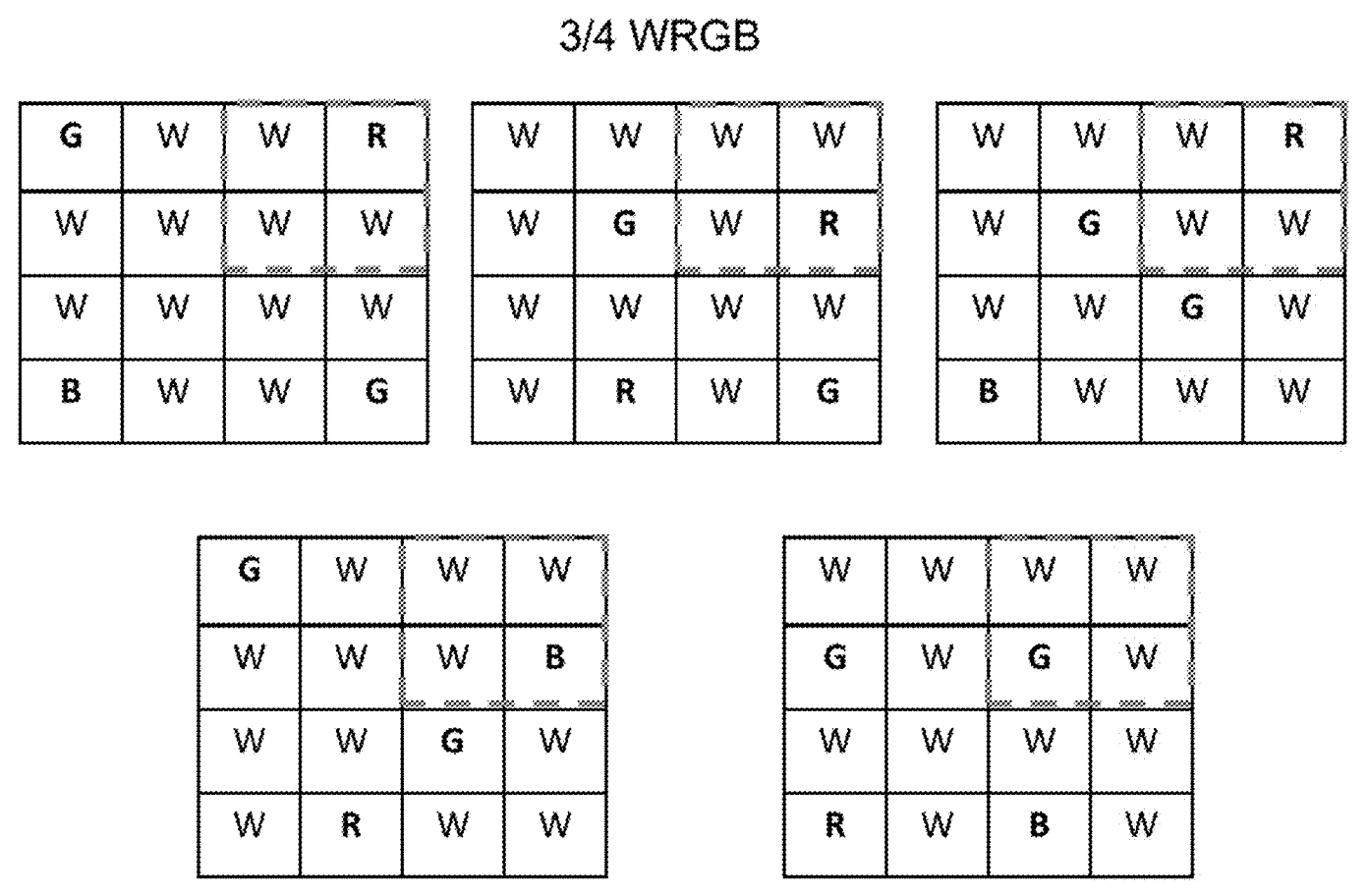

FIG. 2 illustrates pixel arrays of several 3/4 WRGB color filter arrays in accordance with embodiments of the present invention. Each of the 3/4 WRGB color filter arrays has a plurality of pixel arrays. As shown in FIG. 2, each pixel array consists of a four (4) 2×2 pixel units, and each 2×2 pixel unit has three (3) white pixels and one (1) color (red, green or blue) pixel.

In another embodiments, the color filter array can be a 5/9 WRGB color filter array, a 6/9 WRGB color filter array, a 7/9 WRGB color filter array, an 8/9 WRGB color filter array, etc. For example, a 5/9 WRGB color filter array can have a plurality of pixel arrays, and each pixel array consists of a four (4) 3×3 pixel units, and each 3×3 pixel unit has five (5) white pixels and four (4) color (the combination of red, green, and/or blue) pixels. In particular, each pixel array (consisting of a four (4) 3×3 pixel units) consists of four (4) red pixels, eight (8) green pixels, four (4) blue pixels and twenty (20) white pixels. It should be noted that the present invention can also apply to other WRGB color filter arrays having N×N pixel units that are larger than 2×2 pixel units and 3×3 pixel units.

A 6/9 WRGB color filter array can have a plurality of pixel arrays, and each pixel array consists of a four (4) 3×3 pixel units, and each 3×3 pixel unit has six (6) white pixels and three (3) color (the combination of red, green, and/or blue) pixels. In particular, each pixel array (consisting of a four (4) 3×3 pixel units) consists of four (4) red pixels, four (4) green pixels, four (4) blue pixels and twenty four (24) white pixels, or consists of three (3) red pixels, six (6) green pixels, three (3) blue pixels and twenty four (24) white pixels.

A 7/9 WRGB color filter array can have a plurality of pixel arrays, and each pixel array consists of a four (4) 3×3 pixel units, and each 3×3 pixel unit has seven (7) white pixels and two (2) color (the combination of red, green, and/or blue) pixels. In particular, each pixel array (consisting of a four (4) 3×3 pixel units) consists of two (2) red pixels, four (4) green pixels, two (2) blue pixels and twenty eight (28) white pixels.

A 8/9 WRGB color filter array can have a plurality of pixel arrays, and each pixel array consists of a four (4) 3×3 pixel units, and each 3×3 pixel unit has eight (8) white pixels and one (1) color (red, green, or blue) pixel. In particular, each pixel array (consisting of a four (4) 3×3 pixel units) consists of one (1) red pixel, two (2) green pixels, one (1) blue pixel and thirty two (32) white pixels.

Figure 3:
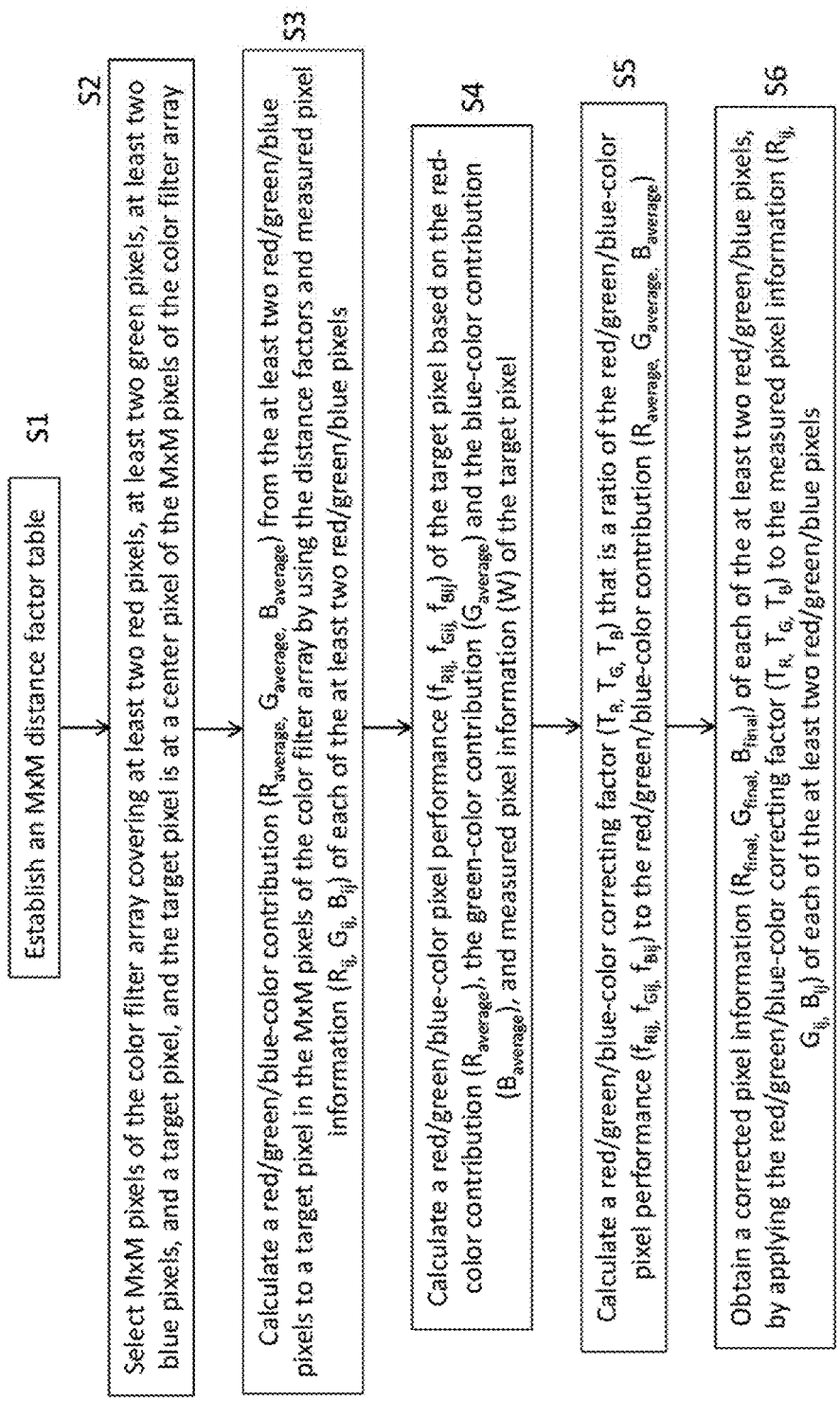
FIG. 3 is a flow chart illustrating the steps of correcting pixel information of color pixels on a color filter array of an image sensor in accordance with an embodiment of the present invention.

As mentioned, the more number of the white pixels in a color filter array, the higher the image sensitivity of the image sensor and the lower the image resolution of the image sensor. FIG. 3 is a flow chart illustrating the steps of correcting pixel information of color pixels on a color filter array of an image sensor in accordance with an embodiment of the present invention, thereby providing an image sensor that can provide higher image sensitivity without scarifying its image resolution.

As embodied in FIG. 3, the method of correcting pixel information of color pixels on a color filter array of an image sensor in accordance with an embodiment of the present invention includes:

establishing an M×M distance factor table having M×M distance factors ($d_{fij}$) (Step S1);

selecting M×M pixels of the color filter array, wherein the M×M pixels of the color filter array cover at least two red pixels, at least two green pixels, at least two blue pixels, and a target pixel, and the target pixel is a center pixel of the M×M pixels of the color filter array (Step S2);

calculating a red-color contribution ($R_{average}$) from the at least two red pixels to the target pixel in the M×M pixels of the color filter array by using the distance factors of the M×M distance factor table and measured pixel information ($R_{ij}$) of each of the at least two red pixels (Step S3);

calculating a green-color contribution ($G_{average}$) from the at least two green pixels to the target pixel in the M×M pixels of the color filter array by using the distance factors of the M×M distance factor table and measured pixel information ($G_{ij}$) of each of the at least two green pixels (Step S3);

calculating a blue-color contribution ($B_{average}$) from the at least two blue pixels to the target pixel in the M×M pixels of the color filter array by using the distance factors of the M×M distance factor table and measured pixel information ($B_{ij}$) of each of the at least two blue pixels (Step S3);

calculating at least one of a red-color pixel performance ($f_{Rij}$) of the target pixel, a green-color pixel performance ($f_{Gij}$) of the target pixel, and a blue-color pixel performance ($f_{Bij}$) of the target pixel, based on the red-color contribution ($R_{average}$), the green-color contribution ($G_{average}$) and the blue-color contribution ($B_{average}$), and measured pixel information (W) of the target pixel (Step S4);

calculating at least one of a red-color correcting factor ($T_R$) that is a ratio of the red-color pixel performance ($f_{Rij}$) to the red-color contribution ($R_{average}$), a green-color correcting factor ($T_G$) that is a ratio of the green-color pixel performance ($f_{Gij}$) to the green-color contribution ($G_{average}$), and a blue-color correcting factor ($T_B$) that is a ratio of the blue-color pixel performance ($f_{Bij}$) to the blue-color contribution ($B_{average}$) (Step S5); and performing at least one of obtaining a corrected pixel information ($R_{final}$) of each of the at least two red pixels, by applying the red-color correcting factor ($T_R$) to the measured pixel information ($R_{ij}$) of each of the at least two red pixels; obtaining a corrected pixel information ($G_{final}$) of each of the at least two green pixels, by applying the green-color correcting factor ($T_G$) to the measured pixel information ($G_{ij}$) of each of the at least two green pixels; and obtaining a corrected pixel information ($B_{final}$) of each of the at least two blue pixels, by applying the blue-color correcting factor ($T_B$) to the measured pixel information ($B_{ij}$) of each of the at least two blue pixels (Step S6).

In particular, as shown in Step S1 of FIG. 3, an M×M distance factor table having M×M distance factors is established. Each of the M×M distance factors ($d_{fij}$) corresponds to one of M×M pixels of the color filter array. The distance factor $d_{fij}$ located at the cross of the $i^{th}$ row and the $j^{th}$ column of the table is $d_{ij}/dc$.

Figure 4:
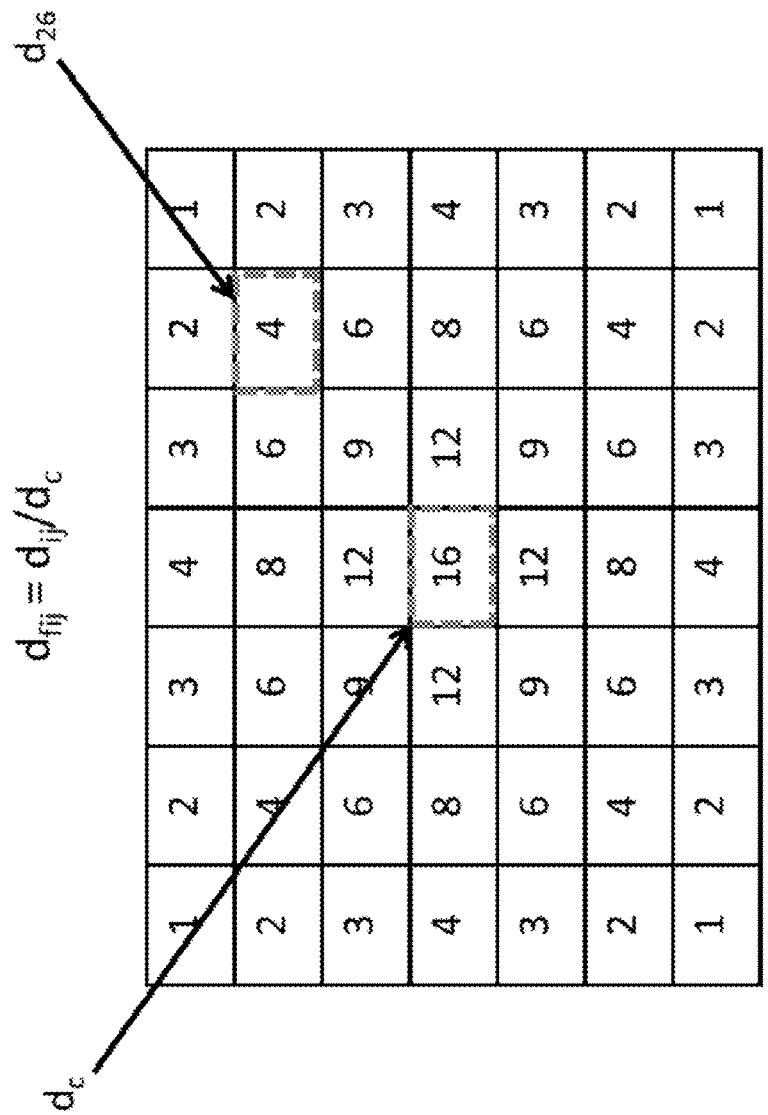
FIG. 4 is a 7×7 distance factor table for a 3/4 WRGB color filter array in accordance with an embodiment of the present invention.

FIG. 4 is a 7×7 (M×M) distance factor table for a 3/4 WRGB color filter array in accordance with an embodiment of the present invention. The 7×7 distance factor table has 7×7 distance factors, and each of the 7×7 distance factors ($d_{fij}$) corresponds to one of 7×7 pixels of the color filter array.

In an embodiment of the present invention, the central distance factor $d_{fc}$ has a highest value among the distance factors in the M×M distance factor table, and the farther a distance factor in the M×M distance factor table is located away from the central distance factor, the lower a value of the distance factor in the M×M distance factor table.

For example, as embodied in FIG. 4, the central distance factor $d_{fc}$ (i.e., $d_{f44}$) in the 7×7 distance factor table is dc/dc (i.e., $d_{44}/d_{44}$)=16/16=1, and the distance factor $d_{f26}=d_{26}/dc=4/16$ (i.e., the distance factor located at the cross of the $2^{nd}$ row and the $6^{th}$ column of the table).

In order to determine how the neighboring color pixels would contribute to a target pixel, an area of M×M pixels of the color filter array is selected, wherein the M×M pixels of the color filter array cover at least two red pixels, at least two green pixels, at least two blue pixels, and a target pixel, and the target pixel is a center pixel of the M×M pixels of the color filter array.

Figure 5A:
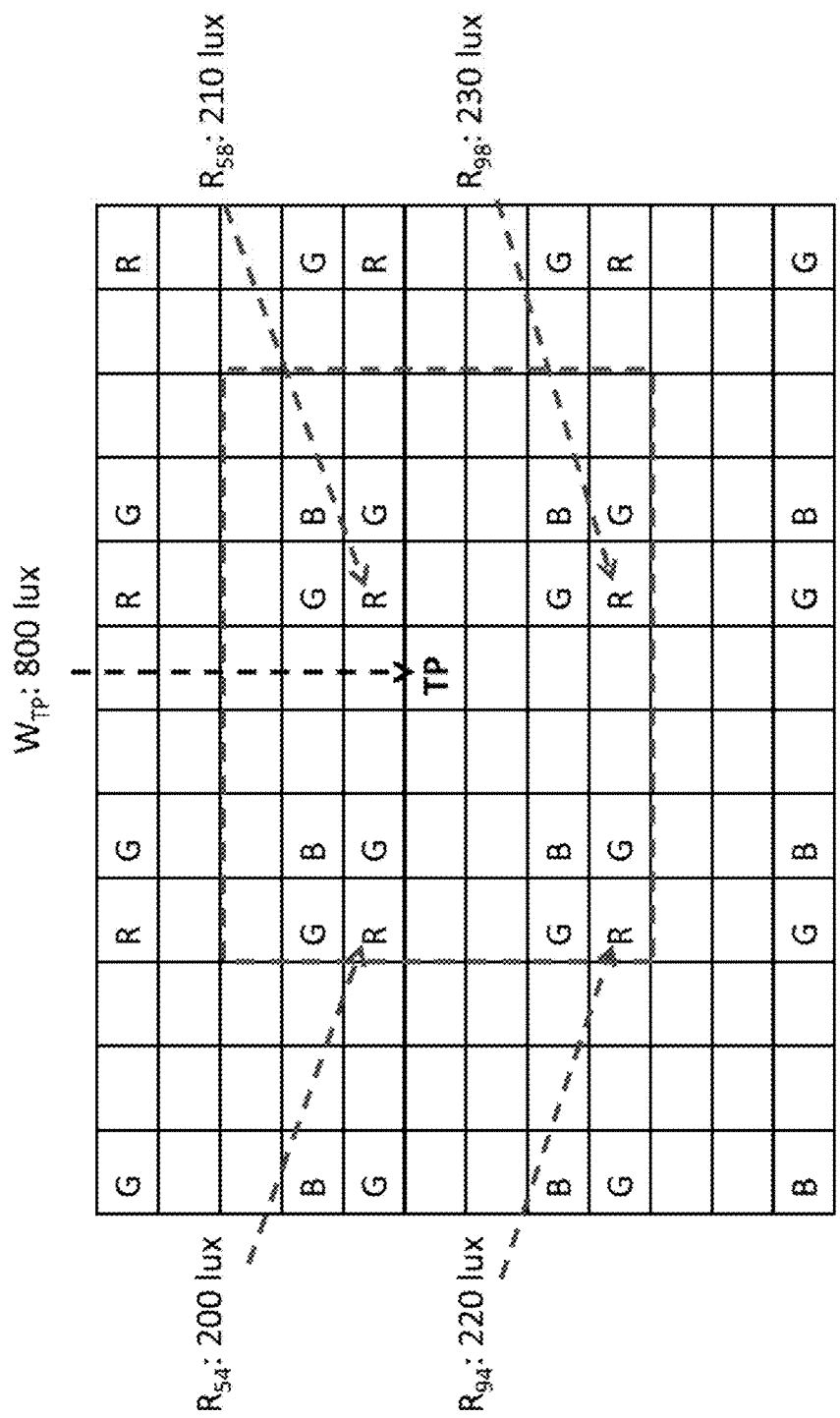
FIGS. 5A-5C illustrate a 3/4 WRGB color filter array with a selected area of 7×7 pixels of the color filter array in accordance with an embodiment of the present invention.
Figure 5B:
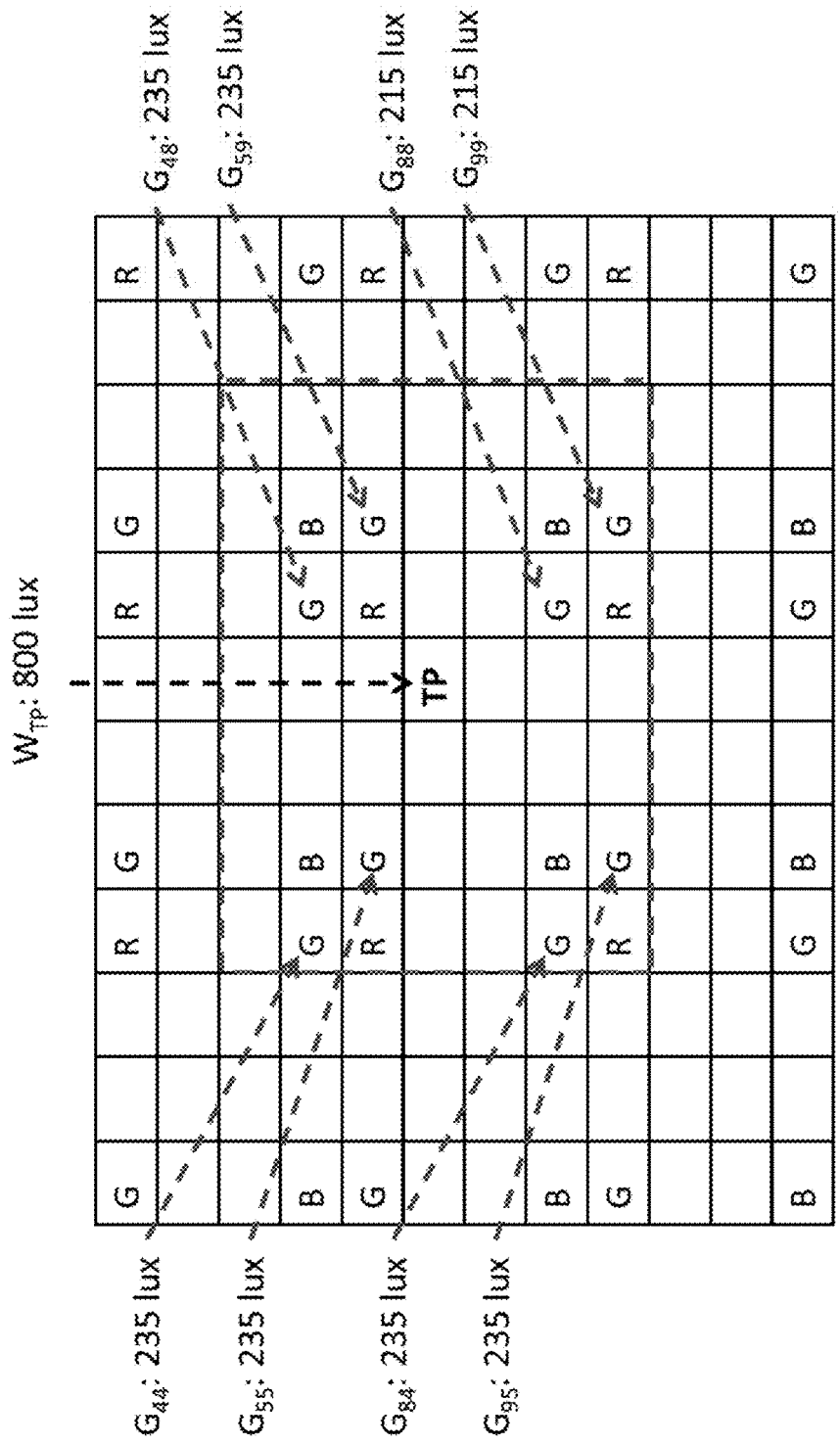
Figure 5C:
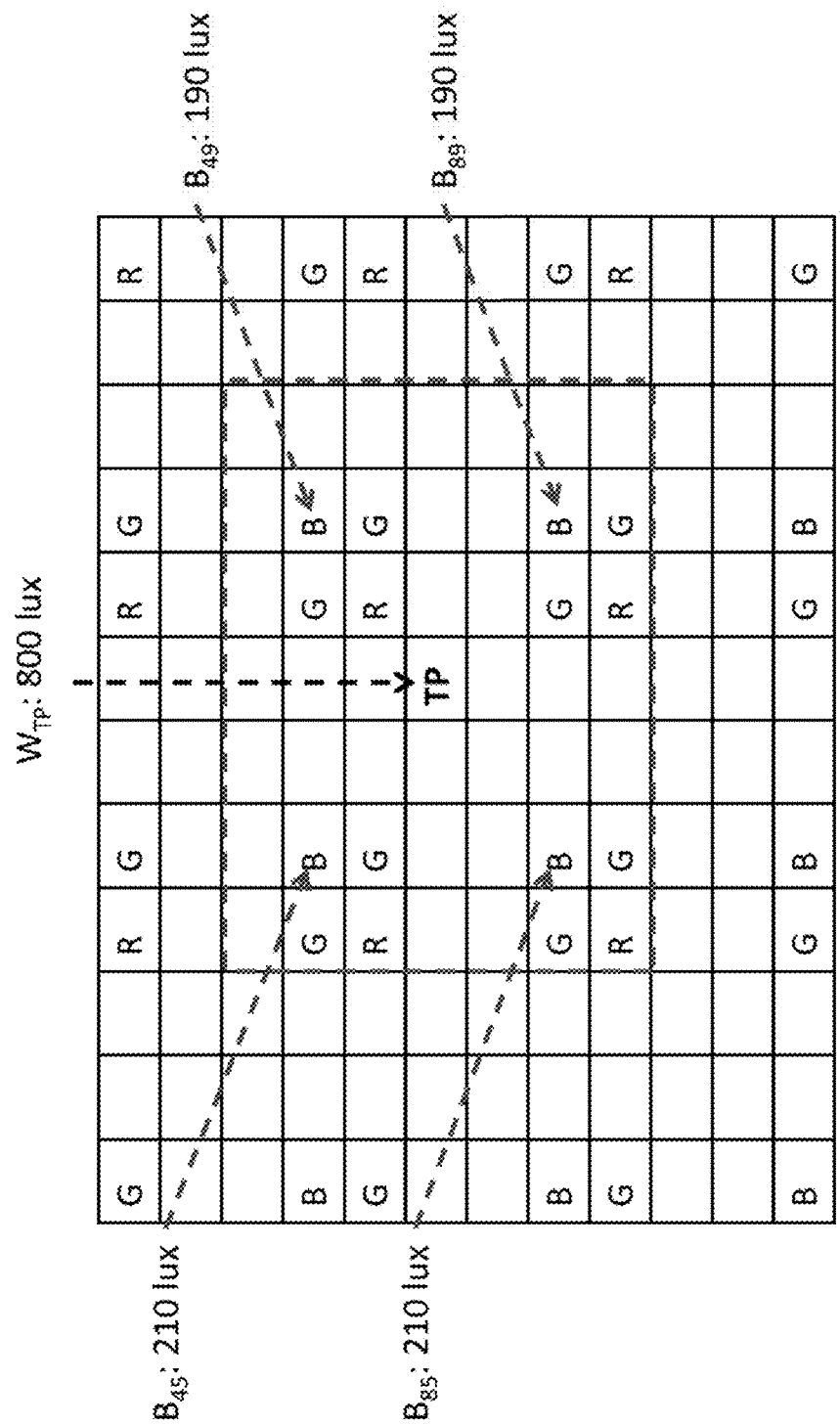

Taking a 3/4 WRGB color filter array (which has a plurality of pixel arrays; each pixel array consists of a four (4) 2×2 pixel units, and each 2×2 pixel unit has three (3) white pixels and one (1) color (red, green or blue) pixel), as shown in FIGS. 5A-5C) as an example, FIGS. 5A-5C illustrate that an area of 7×7 pixels of the color filter array is selected (i.e., the dash box). The selected 7×7 pixels of the color filter array cover four (4) red pixels, eight (8) green pixels, four (4) blue pixels, and thirty three (33) white pixels. The target (white) pixel TP is the center pixel of the selected M×M pixels of the color filter array. It should be noted that each color pixel in the color filter array is labeled as R, G, or B, and all non-labeled pixels are white pixels.

After the M×M distance factor table is established and the area of M×M pixels of the color filter array covering at least two red pixels, at least two green pixels, at least two blue pixels, and the target pixel is selected, a red-color contribution ($R_{average}$) from the at least two red pixels to the target pixel in the M×M pixels of the color filter array is calculated by using the distance factors of the M×M distance factor table and measured pixel information ($R_{ij}$) of each of the at least two red pixels, a green-color contribution ($G_{average}$) from the at least two green pixels to the target pixel in the M×M pixels of the color filter array is calculated by using the distance factors of the M×M distance factor table and measured pixel information ($G_{ij}$) of each of the at least two green pixels, and a blue-color contribution ($B_{average}$) from the at least two blue pixels to the target pixel in the M×M pixels of the color filter array is calculated by using the distance factors of the M×M distance factor table and measured pixel information ($B_{ij}$) of each of the at least two blue pixels.

As embodied in FIG. 5A, the measured pixel information ($R_{ij}$) of the four (4) red pixels is as follows: $R_{54}$=200 lux, $R_{94}$=220 lux, $R_{58}$=210 lux, and $R_{98}$=230 lux. Also, as embodied in FIG. 5B, the measured pixel information ($G_{ij}$) of the eight (8) green pixels is as follows: $G_{44}$=235 lux, $G_{48}$=235 lux, $G_{55}$=235 lux, $G_{59}$=235 lux, $G_{84}$=235 lux, $G_{88}$=215 lux, $G_{95}$=235 lux, and $G_{99}$=215 lux, and as embodied in FIG. 5C, the measured pixel information ($B_{ij}$) of the four (4) blue pixels is as follows: $B_{45}$=210 lux, $B_{49}$=190 lux, $B_{85}$=210 lux, and $B_{89}$=190 lux. In addition, the measured pixel information ($W_{TP}$) of the target pixel TP is 800 lux. It should be noted that the measured pixel information of the color pixels and the target pixel shown in FIGS. 5A-5C are simply used to illustrate how to calculate the color contribution from the color pixels in the selected M×M pixels to the target pixel, and in no event limits the scope of the present invention. In addition, since it is known in the art regarding how the pixel information is measured, no further detailed description will be made regarding how the pixel information is measured.

In an embodiment of the present invention, the step of calculating the red-color contribution ($R_{average}$) from the at least two red pixels to the target pixel includes:

(a) assigning the M×M distance factor table to second M×M pixels of the color filter array, wherein one of the at least two red pixels corresponds to a central distance factor that is located at the center of the M×M distance factor table, and the target pixel corresponds to a distance factor in the M×M distance factor table based on a relative location of the target pixel to the one of the at least two red pixels;

(b) multiplying the measured pixel information ($R_{ij}$) of the one of the at least two red pixels with the distance factor corresponding to the target pixel repeating the steps (a) and (b) for each of the at least two red pixels; and calculating the red-color contribution ($R_{average}$) from the at least two red pixels to the target pixel as a ratio of A to B, where A is a sum of the step (b) for each of the at least two red pixels, and B is a sum of the distance factor ($d_{fij}$) of the target pixel in each of the repeated steps (a).

Taking the 3/4 WRGB color filter array shown in FIG. 5A as an example, and applying the 7×7 distance factor table as shown in FIG. 4, FIGS. 6A-D illustrate how the red-color contribution ($R_{average}$) from the four (4) red pixels to the target (white) pixel TP in the 7×7 pixels of the 3/4 WRGB color filter array is calculated, in accordance with an embodiment of the present invention.

Figure 6A:
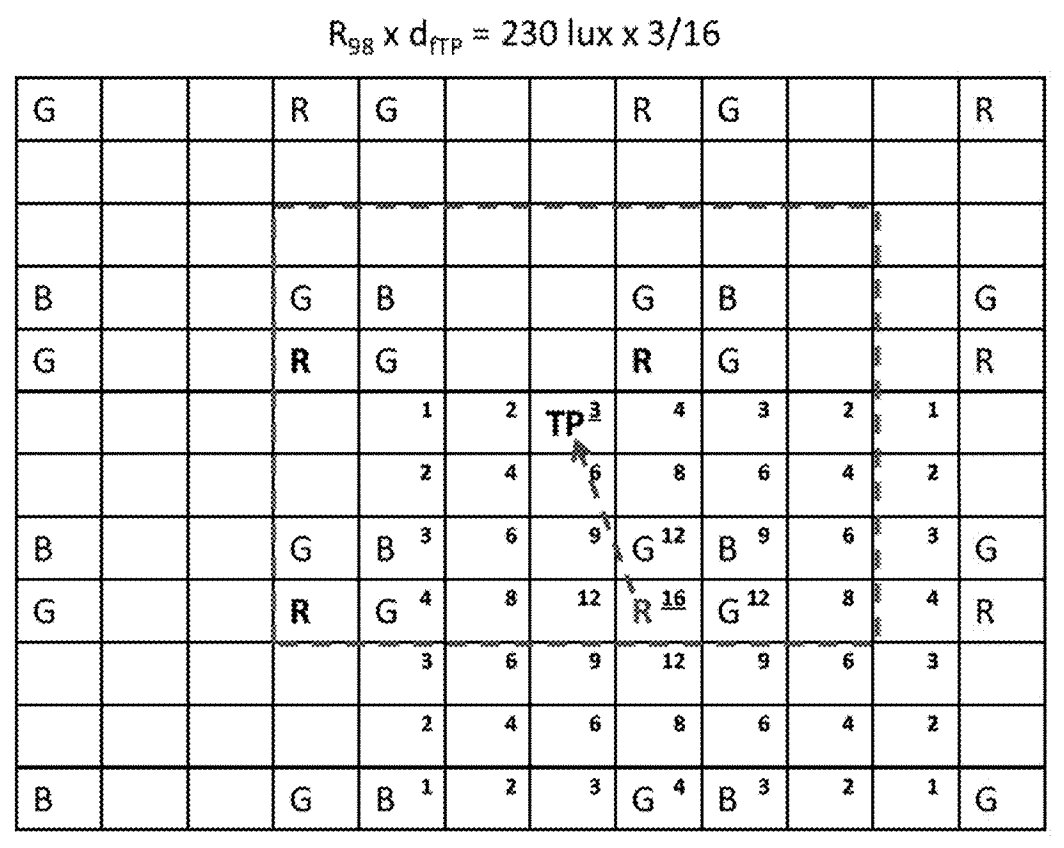
Figure 6B:
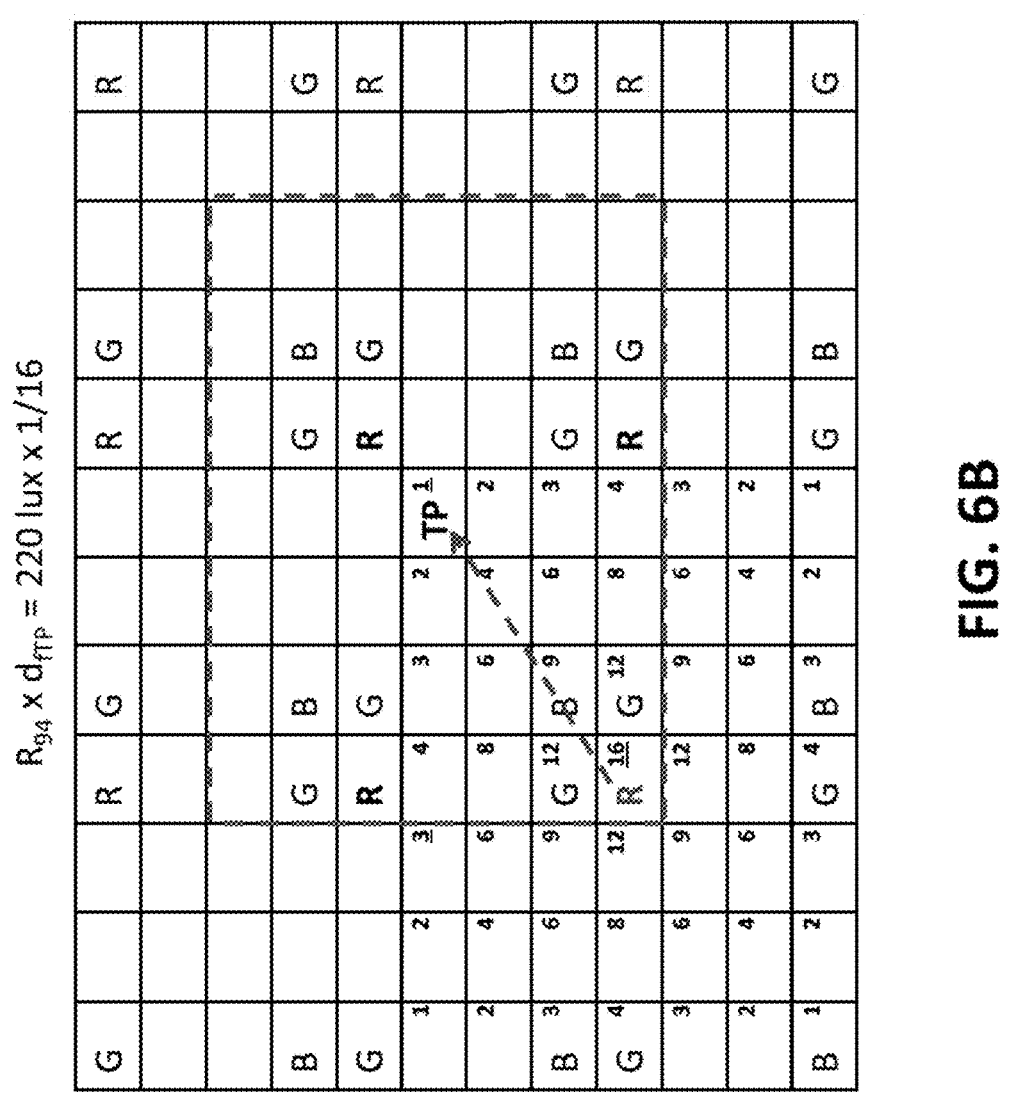
Figure 6C:
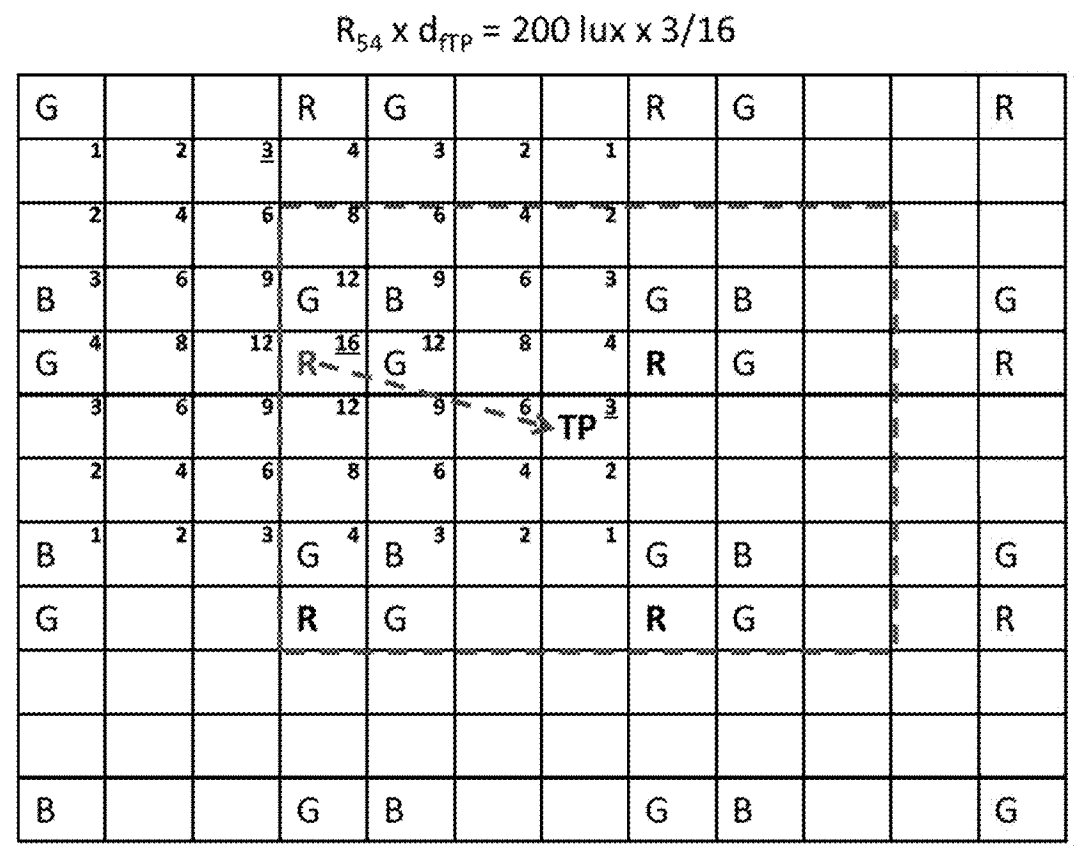
Figure 6D:
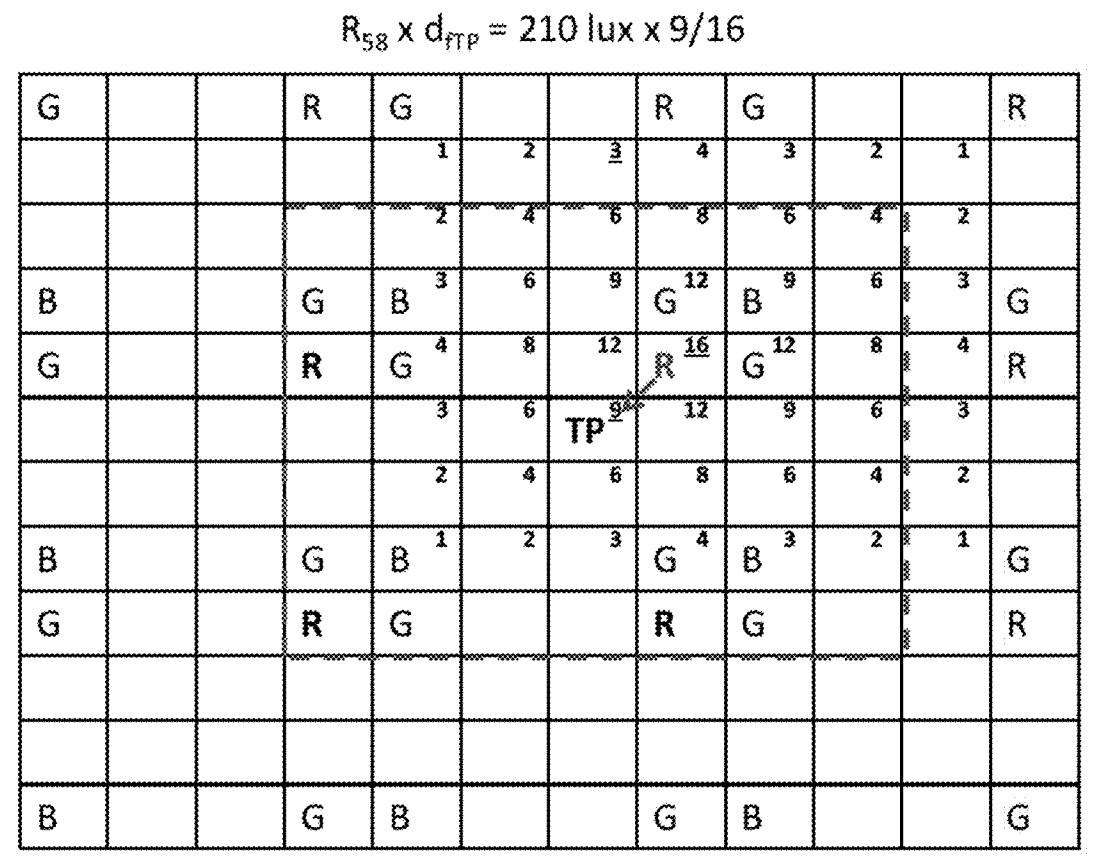
Figure 6E:
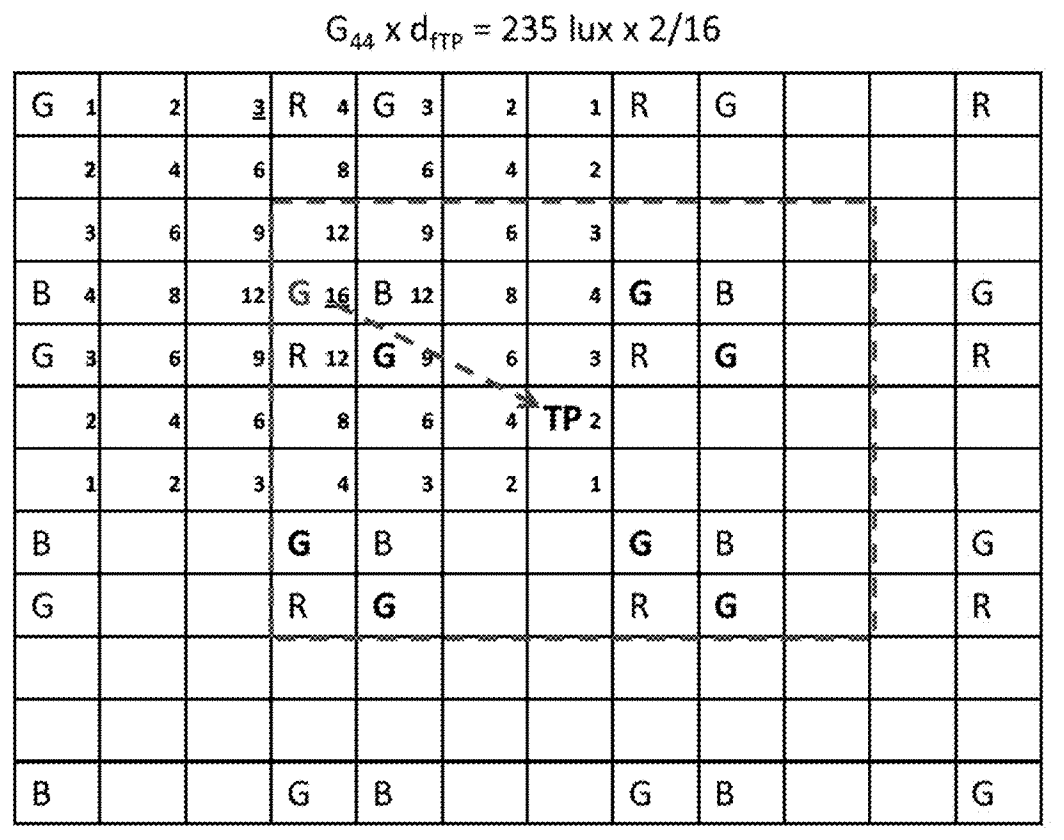
Figure 6F:
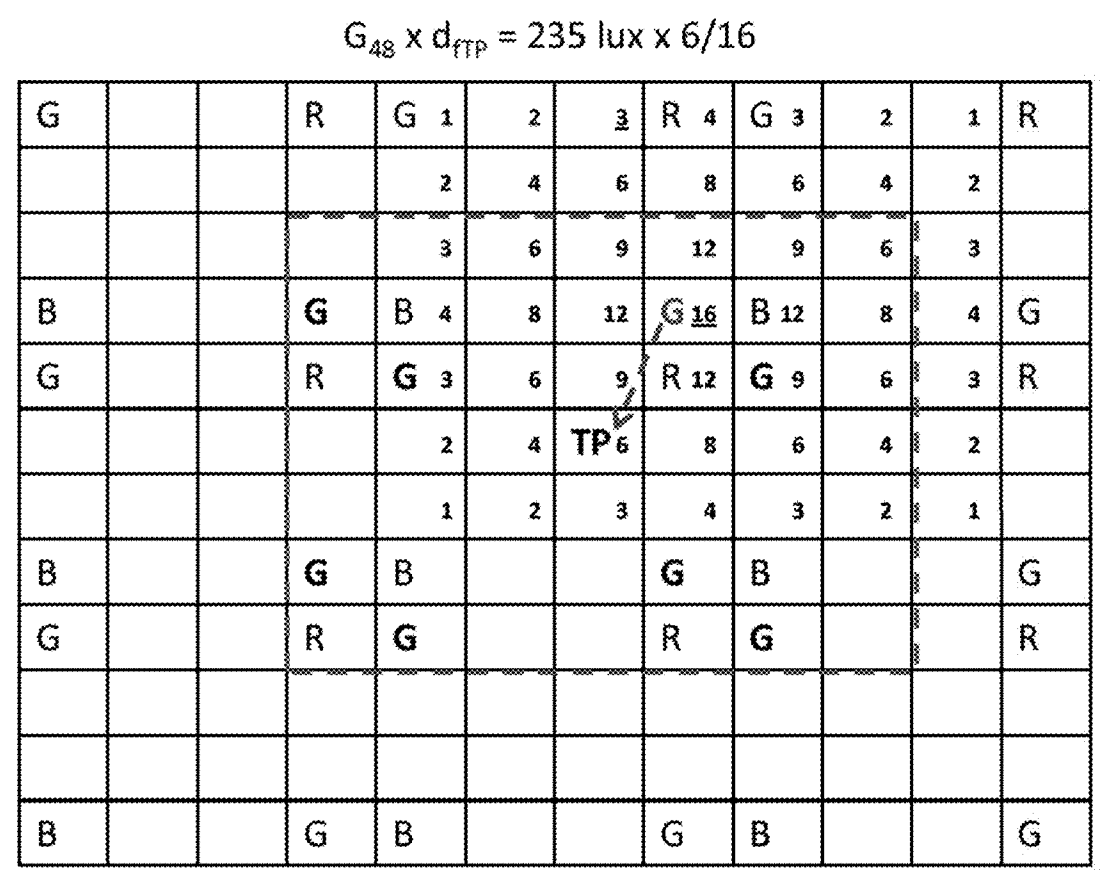
Figure 6G:
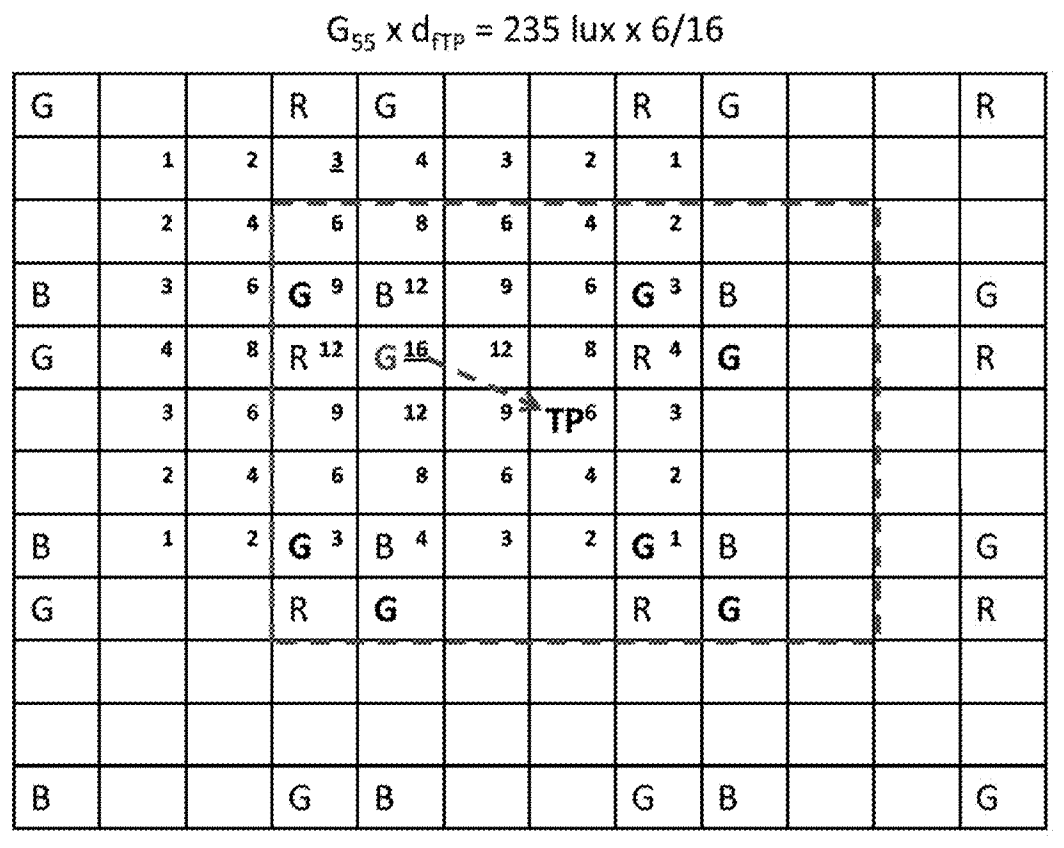
Figure 6J:
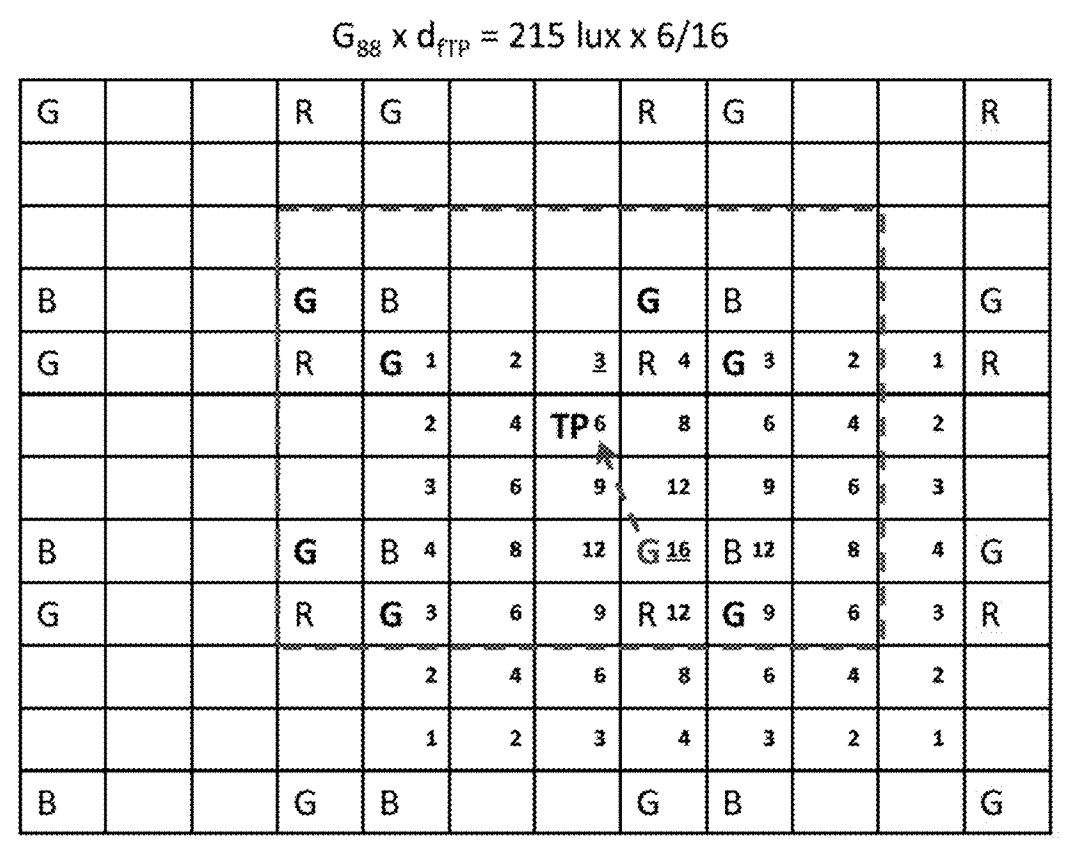
Figure 6L:
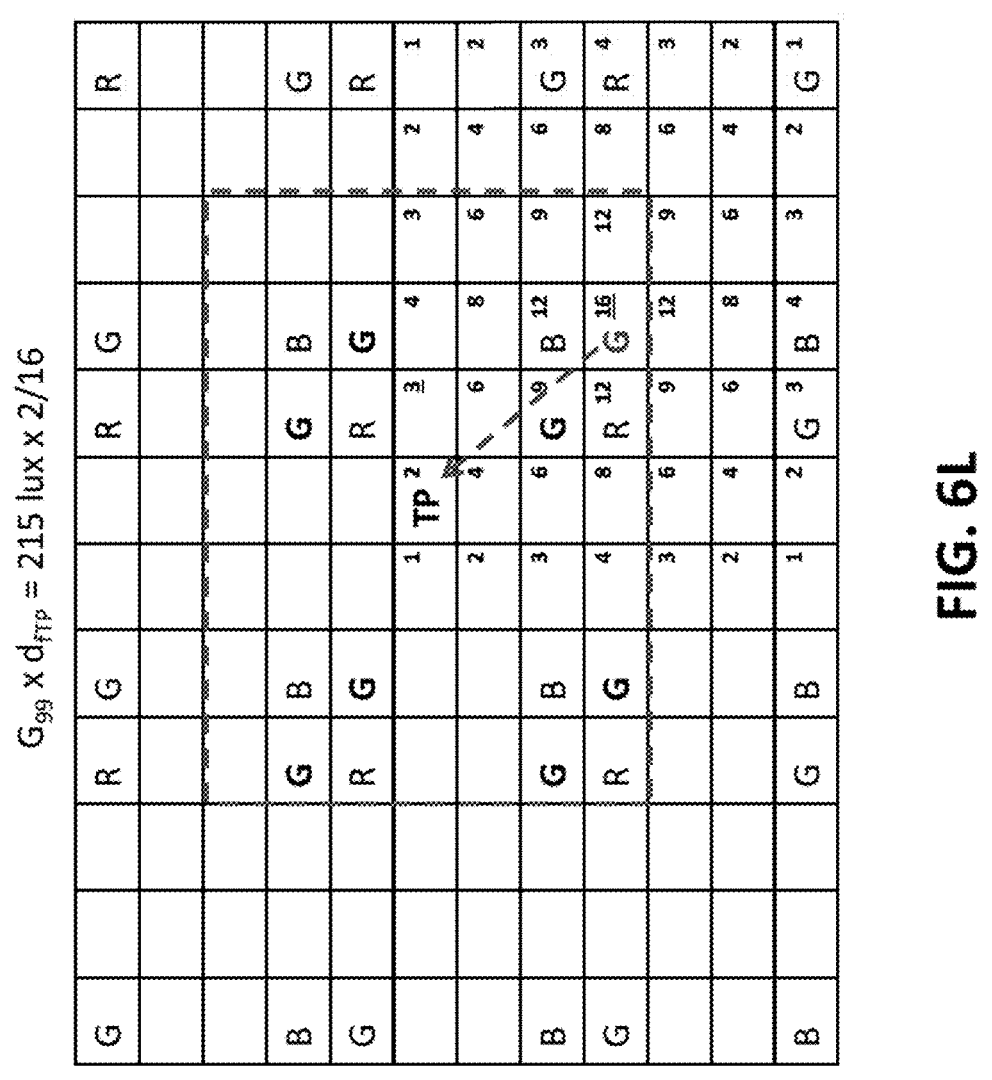
Figure 6M:
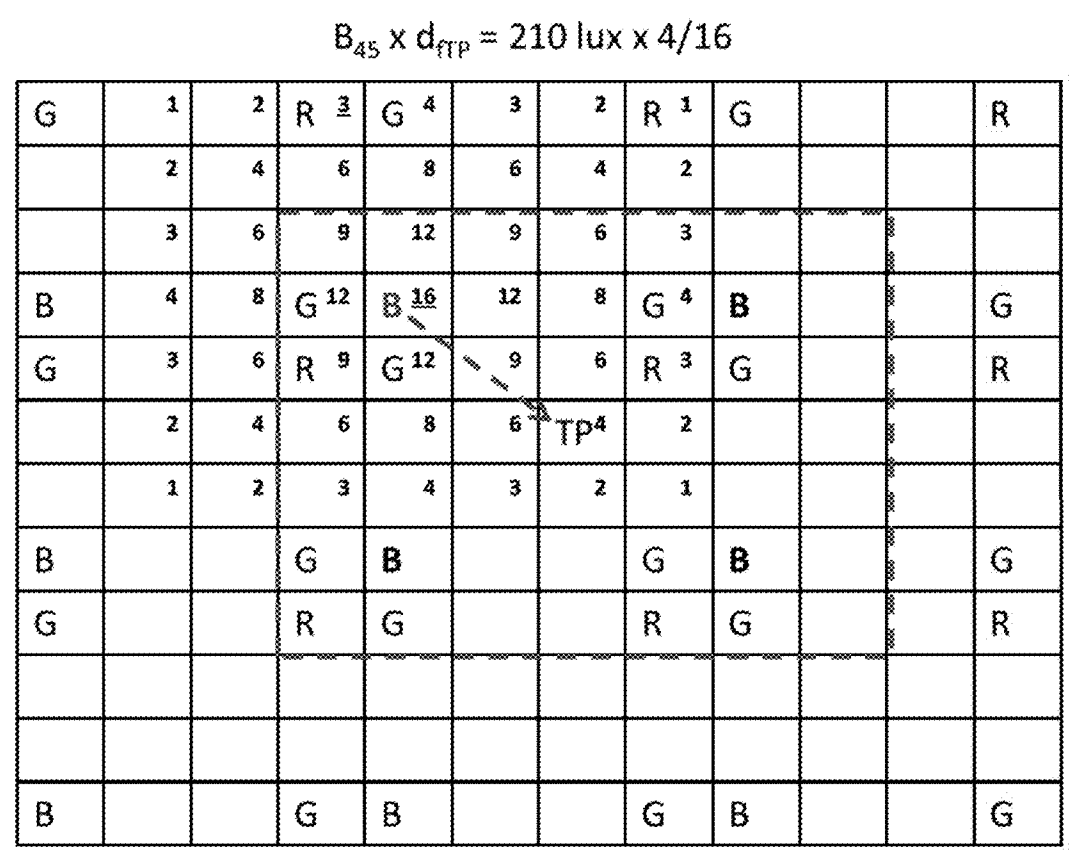
Figure 6N:
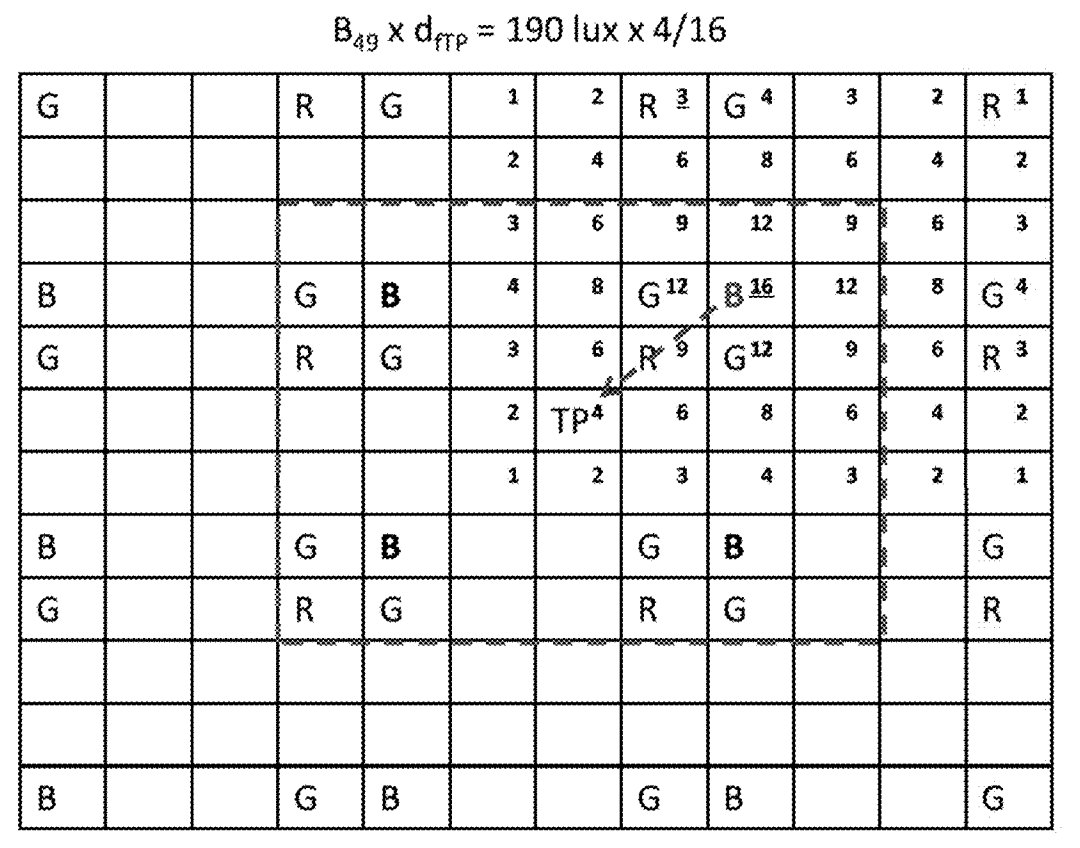
Figure 6P:
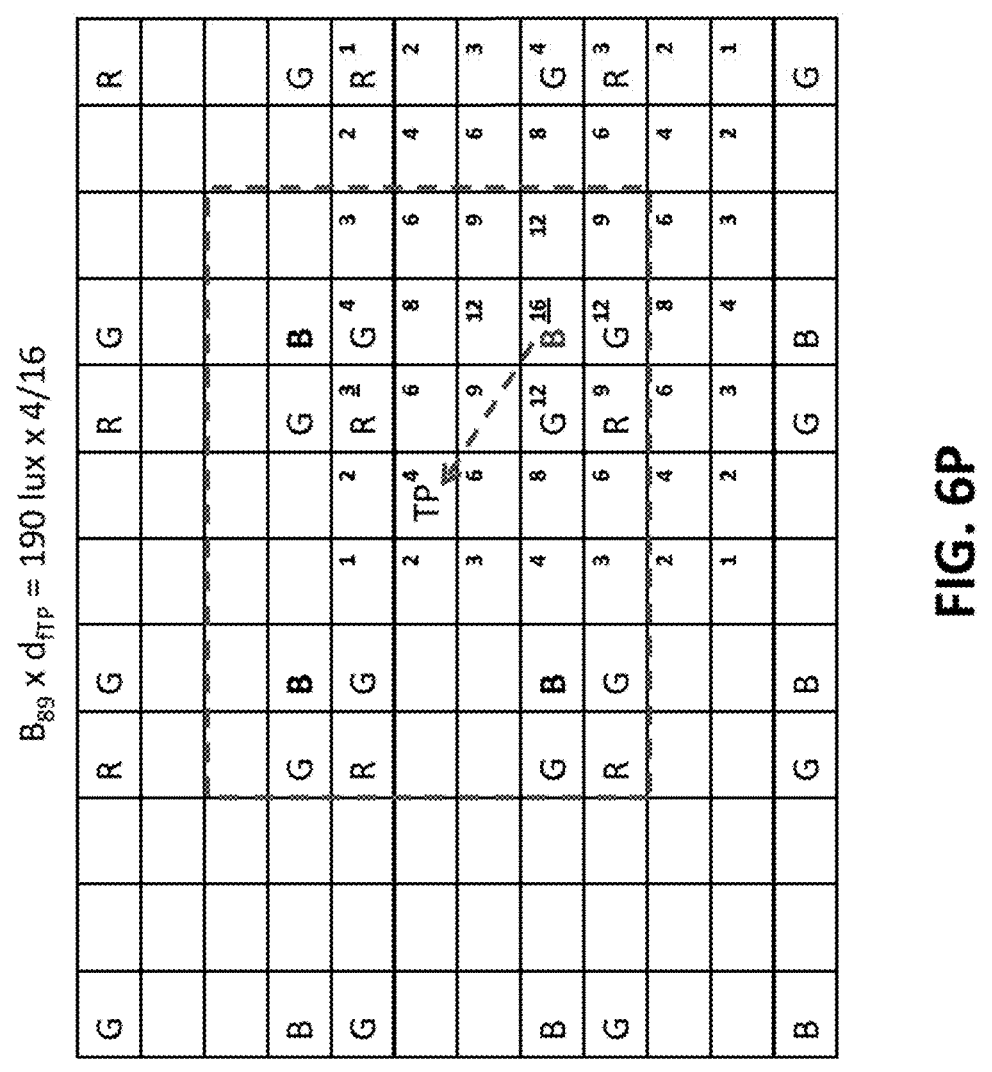

As shown in FIG. 6A, the 7×7 distance factor table is assigned to 7×7 pixels of the 3/4 WRGB color filter array (step (a)), wherein one (i.e., the pixel labeled "16" in FIG. 6A) of the four (4) red pixels corresponds to a central distance factor ($d_{fc}=d_c/d_c=16/16$) that is located at the center of the 7×7 distance factor table, and the target pixel corresponds to a distance factor ($d_{f13}=d_{13}/d_c=3/16$) in the 7×7 distance factor table based on a relative location of the target pixel to the one of the four (4) red pixels.

Then, the measured pixel information ($R_{98}$: 230 lux) of the one (i.e., the pixel labeled "16" in FIG. 6A) of the four (4) red pixels is multiplied with the distance factor corresponding to the target pixel (i.e., 3/16)(step (b)), which can be presented as $R_{98} \times d_{fTP} = 230$ lux×3/16, where $d_{fTP}$ is $d_{f13}$.

The above-noted steps (a) and (b) are repeated for each of the four (4) red pixels, as embodied in FIGS. 6A-6D to obtain the following information:

$R_{98} \times d_{f13} = 230$ lux×3/16 (see FIG. 6A);
$R_{94} \times d_{f17} = 220$ lux×1/16 (see FIG. 6B);
$R_{54} \times d_{f57} = 200$ lux×3/16 (see FIG. 6C); and
$R_{58} \times d_{f53} = 210$ lux×9/16 (see FIG. 6D).

After the above-noted steps are repeated for each of the four (4) red pixels, the red-color contribution ($R_{average}$) from the four (4) red pixels to the target pixel TP as a ratio of A to B is calculated, where A is a sum of the step (b) for each of the four (4) red pixels, and B is a sum of the distance factor ($d_{fij}$) of the target pixel in each of the repeated steps (a). Therefore, the red-color contribution ($R_{average}$) can be presented as follows:

$$R_{average} = \Sigma R_{ij} \times d_f / \Sigma d_f = (R_{98} \times d_{f13} + R_{94} \times d_{f17} + R_{54} \times d_{f57} + R_{58} \times d_{f53})/(d_{f13} + d_{f17} + d_{f57} + d_{f53}) = (230 \text{ lux} \times 3/16 + 220 \text{ lux} \times 1/16 + 200 \text{ lux} \times 3/16 + 210 \text{ lux} \times 9/16)/(3/16 + 1/16 + 3/16 + 9/16) = 212.5 \text{ lux.}$$

Similarly, the green-color contribution ($G_{average}$) and the blue-color contribution ($B_{average}$) can be calculated in the same manner as the red-color contribution ($R_{average}$)(see FIGS. 6E-6L and 6M-6P).

Using the measured information in FIGS. 5A-5C, the red-color contribution ($R_{average}$), the green-color contribution ($G_{average}$) and the blue-color contribution ($B_{average}$) are 212.5 lux, 230 lux and 200 lux, respectively. In particular, $G_{average} = \Sigma G_{ij} \times d_f / \Sigma d_f = (G_{44} \times d_{f67} + G_{48} \times d_{f63} + G_{55} \times d_{f56} + G_{59} \times d_{f52} + G_{84} \times d_{f27} + G_{88} \times d_{f23} + G_{95} \times d_{f16} + G_{99} \times d_{f12})/(d_{f67} + d_{f63} + d_{f56} + d_{f52} + d_{f27} + d_{f23} + d_{f16} + d_{f12}) = (235 \text{ lux} \times 2/16 + 235 \text{ lux} \times 6/16 + 235 \text{ lux} \times 6/16 + 235 \text{ lux} \times 6/16 + 235 \text{ lux} \times 2/16 + 215 \text{ lux} \times 6/16 + 235 \text{ lux} \times 2/16 + 215 \text{ lux} \times 2/16)/(2/16 + 6/16 + 6/16 + 6/16 + 2/16 + 6/16 + 2/16 + 2/16) = 230$ lux (see FIGS. 6E-6L), and $B_{average} = \Sigma B_{ij} \times d_f / \Sigma d_f = (B_{45} \times d_{f66} + B_{49} \times d_{f62} + B_{85} \times d_{f26} + B_{89} \times d_{f22})/(d_{f66} + d_{f62} + d_{f26} + d_{f22}) = (210 \text{ lux} \times 4/16 + 190 \text{ lux} \times 4/16 + 210 \text{ lux} \times 4/16 + 190 \text{ lux} \times 4/16)/(4/16 + 4/16 + 4/16 + 4/16) = 200$ lux (see FIGS. 6M-6P).

In another embodiment of the present invention, the step of calculating the red-color contribution ($R_{average}$) from the at least two red pixels to the target pixel includes:

(a') assigning the M×M distance factor table to the M×M pixels of the color filter array, wherein the target pixel corresponds to a central distance factor that is located at the center of the M×M distance factor table, and the at least two red pixels respectively correspond to two distance factors in the M×M distance factor table based on relative locations of the at least two red pixels to the target pixel;

(b') multiplying the measured pixel information ($R_{ij}$) of each of the at least two red pixels with a corresponding one of the two distance factors in the M×M distance factor table; and calculating the red-color contribution ($R_{average}$) from the at least two red pixels to the target pixel as a ratio of A to B, where A is a sum of the step (b') for each of the at least two red pixels, and B is a sum of the distance factor ($d_{fij}$) of each of the at least two red pixels.

Figure 7A:
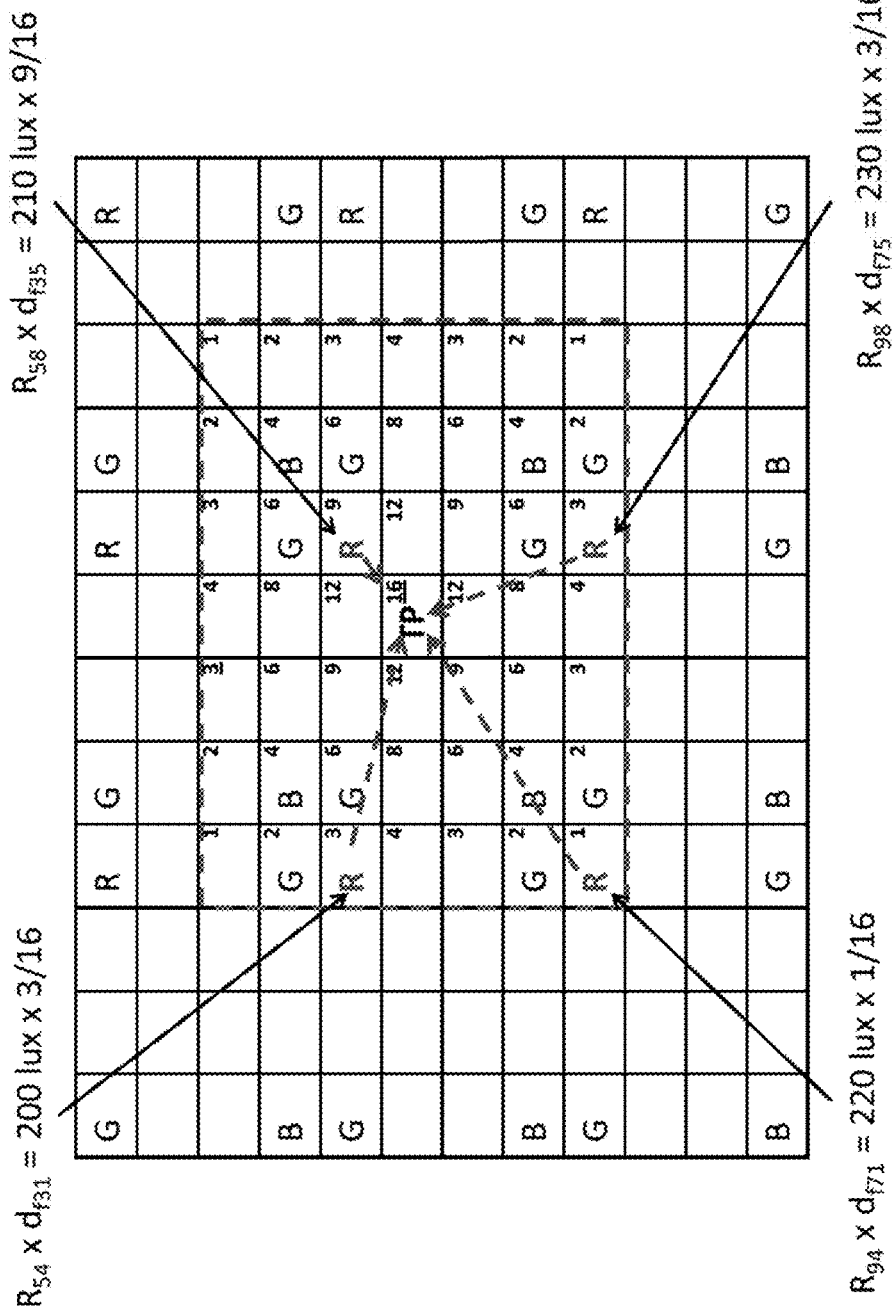

Taking the 3/4 WRGB color filter array shown in FIGS. 5A-5C as an example, and applying the 7×7 distance factor table as shown in FIG. 4, FIG. 7A illustrates how the red-color contribution ($R_{average}$) from the four (4) red pixels to the target (white) pixel TP in the 7×7 pixels of the 3/4 WRGB color filter array is calculated, in accordance with this embodiment of the present invention.

As shown in FIG. 7A, the 7×7 distance factor table is assigned to the selected 7×7 pixels of the color filter array, wherein the target pixel corresponds to a central distance factor that is located at the center of the 7×7 distance factor table, and the four (4) red pixels respectively correspond to four (4) distance factors (i.e., $d_{f75}$, $d_{f71}$, $d_{f31}$, $d_{f35}$) in the 7×7 distance factor table based on relative locations of the four (4) red pixels to the target pixel TP.

Then, the measured pixel information ($R_{ij}$, i.e., $R_{98}$, $R_{94}$, $R_{54}$, $R_{58}$) of each of the four (4) red pixels is multiplied with a corresponding one of the four (4) distance factors (i.e., $d_{f75}$, $d_{f71}$, $d_{f81}$, $d_{f35}$) in the 7×7 distance factor table, thereby obtaining the following information:

$R_{98} \times d_{f75} = 230$ lux×3/16;

$R_{94} \times d_{f71} = 220$ lux×1/16;

$R_{54} \times d_{f31} = 200$ lux×3/16; and $R_{58} \times d_{f35} = 210$ lux×9/16.

Then, the red-color contribution ($R_{average}$) from the (4) red pixels to the target pixel TP as a ratio of A to B is calculated, where A is a sum of the step (b') for each of the four (4) red pixels, and B is a sum of the distance factor ($d_{fij}$) of each of the four (4) red pixels. Therefore, the red-color contribution ($R_{average}$) can be presented as follows:

$R_{average} = \Sigma R_{ij} \times d_f / \Sigma d_f = (R_{98} \times d_{f75} + R_{94} \times d_{f71} + R_{54} \times d_{f31} + R_{58} \times d_{f35})/(d_{f75} + d_{f71} + d_{f31} + d_{f35}) = (230 \text{ lux} \times 3/16 + 220 \text{ lux} \times 1/16 + 200 \text{ lux} \times 3/16 + 210 \text{ lux} \times 9/16)/(3/16 + 1/16 + 3/16 + 9/16) = 212.5$ lux.

Figure 7B:
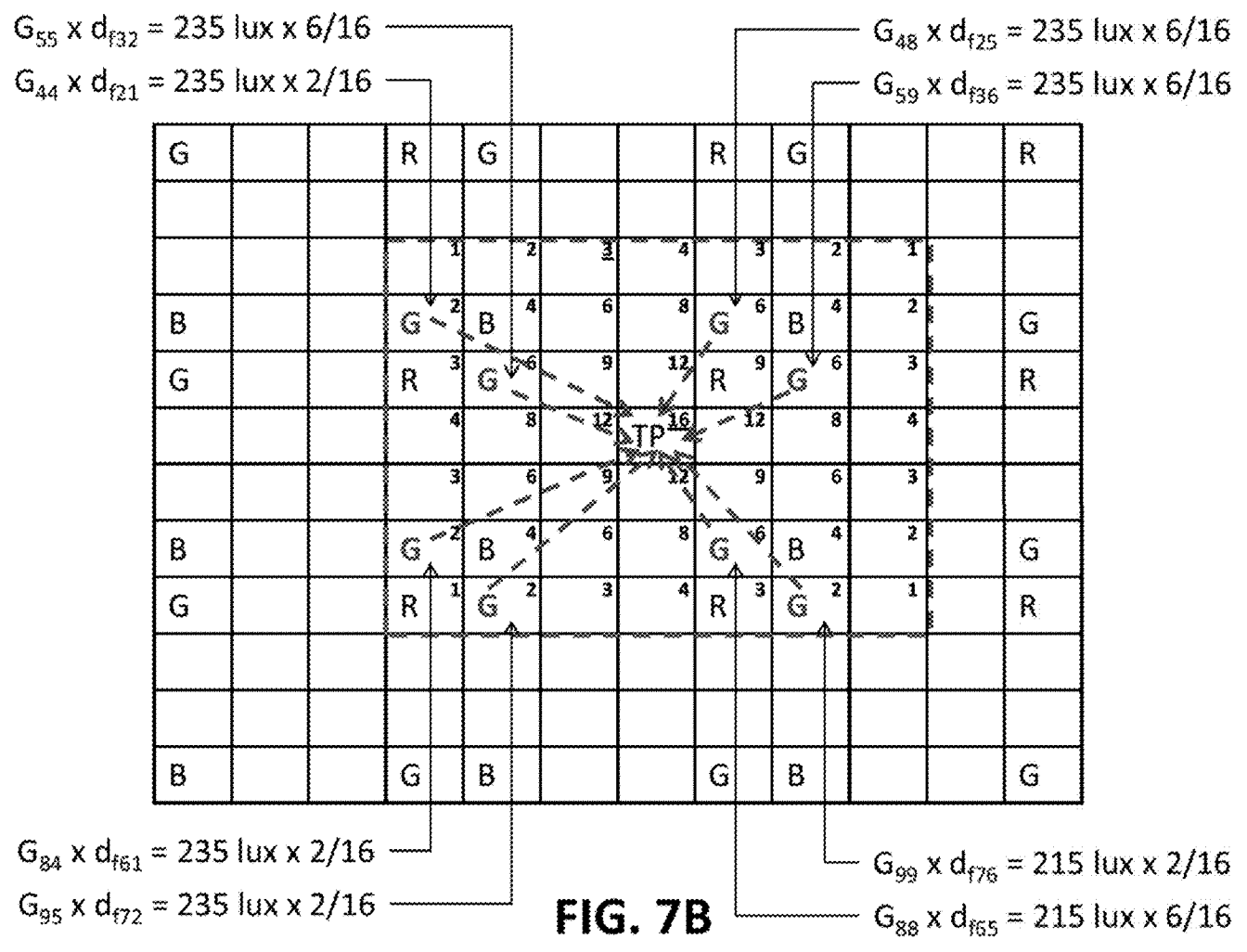
Figure 7C:
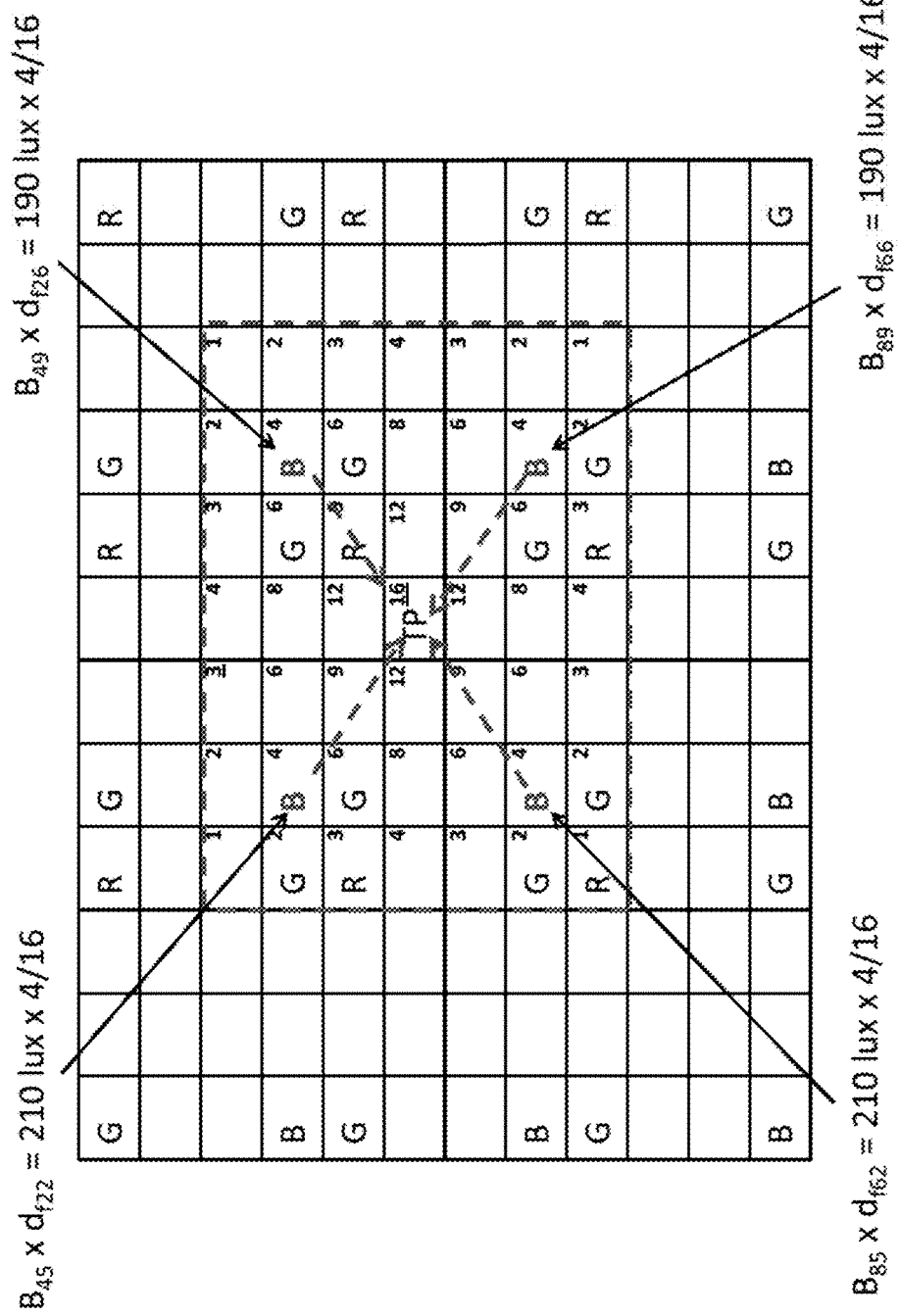

Similarly, the green-color contribution ($G_{average}$) and the blue-color contribution ($B_{average}$) can be calculated in the same manner as the red-color contribution ($R_{average}$)(see FIGS. 7B and 7C).

Using the measured information in FIGS. 5A-5C, the red-color contribution ($R_{average}$), the green-color contribution ($G_{average}$) and the blue-color contribution ($B_{average}$) are 212.5 lux, 230 lux and 200 lux, respectively. In particular, $G_{average} = \Sigma G_{ij} \times d_f / \Sigma d_f = (G_{44} \times d_{f21} + G_{48} \times d_{f25} + G_{55} \times d_{f32} + G_{59} \times d_{f36} + G_{84} \times d_{f61} + G_{88} \times d_{f65} + G_{95} \times d_{f72} + G_{99} \times d_{f76})/(d_{f21} + d_{f35} + d_{f32} + d_{f36} + d_{f61} + d_{f65} + d_{f72} + d_{f76}) = (235 \text{ lux} \times 2/16 + 235 \text{ lux} \times 6/16 + 235 \text{ lux} \times 6/16 + 235 \text{ lux} \times 6/16 + 235 \text{ lux} \times 2/16 + 215 \text{ lux} \times 6/16 + 235 \text{ lux} \times 2/16 + 215 \text{ lux} \times 2/16)/(2/16 + 6/16 + 6/16 + 6/16 + 2/16 + 6/16 + 2/16 + 2/16) = 230$ lux (see FIG. 7B)/(2/16+6/16+6/16+6/16+2/16+6/16+2/16+2/16), and $B_{average} = B_{ij} \times d_f / \Sigma d_f = (B_{45} \times d_{f22} + B_{49} \times d_{f26} + B_{85} \times d_{f62} + B_{89} \times d_{f66})/(d_{f22} + d_{f26} + d_{f62} + d_{f66}) = (210 \text{ lux} \times 4/16 + 190 \text{ lux} \times 4/16 + 210 \text{ lux} \times 4/16 + 190 \text{ lux} \times 4/16)44/16 + 4/16 + 4/16 + 4/16) = 200$ lux (see FIG. 7C).

Once the red-color contribution ($R_{average}$), the green-color contribution ($G_{average}$) and the blue-color contribution ($B_{average}$) are calculated, a red-color pixel performance ($f_{Rij}$) of the target pixel is calculated based on the red-color contribution ($R_{average}$), the green-color contribution ($G_{average}$) and the blue-color contribution ($B_{average}$), and the measured pixel information (W) of the target pixel.

In an embodiment, the red-color pixel performance ($f_{Rij}$) of the target pixel is $f_{Rij}=W \cdot R_{average}/(R_{average}+G_{average}+B_{average})$. Using the measured information in FIGS. 5A-5C and the calculated red-color contribution ($R_{average}$), the calculated green-color contribution ($G_{average}$) and the calculated blue-color contribution ($B_{average}$), the red-color pixel performance ($f_{Rij}$) of the target pixel is $=800\times212.5/(212.5+230+200)=264.59$.

Similarly, a green-color pixel performance ($f_{Gij}$) of the target pixel is calculated based on the red-color contribution ($R_{average}$), the green-color contribution ($G_{average}$) and the blue-color contribution ($B_{average}$), and the measured pixel information (W) of the target pixel.

In an embodiment, the green-color pixel performance ($f_{Gij}$) of the target pixel is $f_{Gij}=W \cdot G_{average}/(R_{average}+G_{average}+B_{average})$. Using the measured information in FIGS. 5A-5C and the calculated red-color contribution ($R_{average}$), the calculated green-color contribution ($G_{average}$) and the calculated blue-color contribution ($B_{average}$), the green-color pixel performance ($f_{Gij}$) of the target pixel is $=800\times230/(212.5+230+200)=286.38$.

Similarly, a blue-color pixel performance ($f_{Bij}$) of the target pixel is calculated based on the red-color contribution ($R_{average}$), the green-color contribution ($G_{average}$) and the blue-color contribution ($B_{average}$), and the measured pixel information (W) of the target pixel.

In an embodiment, the blue-color pixel performance ($f_{Bij}$) of the target pixel is $f_{Bij}=W \cdot B_{average}/(R_{average}+G_{average}+B_{average})$. Using the measured information in FIGS. 5A-5C and the calculated red-color contribution ($R_{average}$), the calculated green-color contribution ($G_{average}$) and the calculated blue-color contribution ($B_{average}$), the blue-color pixel performance ($f_{Bij}$) of the target pixel is $=800\times200/(212.5+230+200)=249.03$.

Once the red-color pixel performance ($f_{Rij}$) of the target pixel is obtained, a red-color correcting factor ($T_R$) can be calculated as a ratio of the red-color pixel performance ($f_{Rij}$) to the red-color contribution ($R_{average}$), i.e., $T_R=f_{Rij}/R_{average}$. Using the example above, the red-color correcting factor ($T_R$) is $264.59/212.5=1.245$.

Similarly, once the green-color pixel performance ($f_{Gij}$) of the target pixel is obtained, a green-color correcting factor ($T_G$) can be calculated as a ratio of the green-color pixel performance ($f_{Gij}$) to the green-color contribution ($G_{average}$), i.e., $T_G=f_{Gij}/G_{average}$. Using the example above, the green-color correcting factor ($T_G$) is $286.38/230=1.245$.

Similarly, once the blue-color pixel performance ($f_{Bij}$) of the target pixel is obtained, a blue-color correcting factor ($T_B$) can be calculated as a ratio of the blue-color pixel performance ($f_{Bij}$) to the blue-color contribution ($B_{average}$), i.e., $T_B=f_{Bij}/B_{average}$. Using the example above, the blue-color correcting factor ($T_B$) is $249.03/200=1.245$.

Once the red-color correcting factor ($T_R$) is obtained, a corrected pixel information ($R_{final}$) of each of the at least two red pixels can be obtained, by applying the red-color correcting factor ($T_R$) to the measured pixel information ($R_{ij}$) of each of the at least two red pixels.

In an embodiment, the corrected pixel information ($R_{final}$) is a multiplication of the measured pixel information ($R_{ij}$) of each of the at least two ed p xels and the red-color correcting factor ($T_R$), i.e., $R_{ij(final)}=R_{ij(measured)} \times T_R$.

Using the example in FIGS. 5A-5C, a corrected pixel information ($R_{final}$) of f each of the four (4) red pixels is as follows:

$R_{54(final)}=R_{54(measured)} \times T_R=200$ lux$\times 1.245=249$ lux;

$R_{94(final)}=R_{94(measured)} \times T_R=220$ lux$\times 1.245=273.9$ lux;

$R_{58(final)}=R_{54(measured)} \times T_R=210$ lux$\times 1.245=261.45$ lux; and $R_{98(final)}=R_{54(measured)} \times T_R=230$ lux$\times 1.245=286.35$ lux.

Similarly, once the green-color correcting factor ($T_G$) is obtained, a corrected pixel information ($G_{final}$) of f each of the at least two green pixels can be obtained, by applying the green-color correcting factor ($T_G$) to the measured pixel information ($G_{ij}$) of each of the at least two green pixels.

In an embodiment, the corrected pixel information ($G_{final}$) is a multiplication of the measured pixel information ($G_{ij}$) of each of the at least two green pixels and the green-color correcting factor ($T_G$), i.e., $G_{ij(final)}=G_{ij(measured)} \times T_G$.

Using the example in FIGS. 5A-5C, a corrected pixel information ($G_{final}$) of each of the eight (8) green pixels is as follows:

$G_{44(final)}=G_{44(measured)} \times T_G=235$ lux$\times 1.245=292.575$ lux;

$G_{48(final)}=G_{48(measured)} \times T_G=235$ lux$\times 1.245=292.575$ lux;

$G_{55(final)}=G_{55(measured)} \times T_G=235$ lux$\times 1.245=292.575$ lux;

$G_{59(final)}=G_{59(measured)} \times T_G=235$ lux$\times 1.245=292.575$ lux;

$G_{84(final)}=G_{84(measured)} \times T_G=235$ lux$\times 1.245=292.575$ lux;

$G_{88(final)}=G_{88(measured)} \times T_G=215$ lux$\times 1.245=267.675$ lux;

$G_{95(final)}=G_{95(measured)} \times T_G=235$ lux$\times 1.245=292.575$ lux; and $G_{99(final)}=G_{99(measured)} \times T_G=215$ lux$\times 1.245=267.675$ lux.

Similarly, once the blue-color correcting factor ($T_B$) is obtained, a corrected pixel information ($B_{final}$) of each of the at least two blue pixels can be obtained, by applying the blue-color correcting factor ($T_B$) to the measured pixel information ($B_{ij}$) of each of the at least two blue pixels.

In an embodiment, the corrected pixel information ($B_{final}$) is a multiplication of the measured pixel information ($B_{ij}$) of each of the at least two blue pixels and the blue-color correcting factor ($T_B$), i.e., $B_{ij(final)}=B_{ij(measured)} \times T_B$.

Using the example in FIGS. 5A-5C, a corrected pixel information ($B_{final}$) of each of the four (4) blue pixels is as follows:

$B_{45(final)}=B_{45(measured)} \times T_B=210$ lux$\times 1.245=261.45$ lux;

$B_{49(final)}=B_{49(measured)} \times T_B=190$ lux$\times 1.245=236.55$ lux;

$B_{85(final)}=B_{85(measured)} \times T_B=210$ lux$\times 1.245=261.45$ lux; and $B_{89(final)}=B_{89(measured)} \times T_B=190$ lux$\times 1.245=236.55$ lux.

By applying the red/green/blue-color correcting factor ($T_R/T_G/T_B$) to the measured pixel information ($R_{ij}/G_{ij}/B_{ij}$) of each of the at least two red/green/blue pixels in the selected M×M pixels, the final pixel information of the color pixels are more accurate. This color correcting factor can compensate the measured pixel information due to the increase of the number of the white pixels in the color filter array. Therefore, it can provide higher image sensitivity (by increasing the number of the white pixels in the color filter array) without scarifying its image resolution (by compensating the measured pixel information) of the image sensor.

In addition, although a 7×7 distance factor table is used in the illustrated embodiments, and an area of 7×7 pixels is selected in the illustrated 3/4 WRGB color filter array in the illustrated embodiments, a M×M distance factor table larger than a 7×7 distance factor table and an area of M×M pixels larger than 7×7 pixels can also be selected, as long as the M×M pixels can cover at least two red pixels, at least two green pixels and at least two blue pixels.

Furthermore, for a 5/9 WRGB color filter array, a 5×5 or larger distance factor table can used, and an area of 5×5 pixels or larger can be selected, as long as the area of 5×5 pixels or larger can cover at least two red pixels, at least two green pixels and at least two blue pixels. For the 6/9 WRGB color filter array, the 7/9 WRGB color filter array, or the 8/9 WRGB color filter array, the same principle (i.e., a M×M or larger distance factor table and an area of M×M pixels or larger can be selected, as long as the M×M pixels can cover at least two red pixels, at least two green pixels and at least two blue pixels) also applies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for correcting pixel information of color pixels on a color filter array of an image sensor, the color filter array including a plurality of pixel arrays, each pixel array consisting of a four (4) N×N pixel units, N being an integer equal to or larger than 2, each N×N pixel unit having a plurality of white pixels and at least one color pixel, the at least one color pixel including one or more red pixels, one or more green pixels, one or more blue pixels, or any combination thereof, the number of the at least one color pixel in each of the four (4) N×N pixel units being the same, the number of the at least one color pixel in each of the four (4) N×N pixel units being smaller than the number of the plurality of white pixels in each of the four (4) N×N pixel units, the method comprising:

establishing an M×M distance factor table having M×M distance factors ($d_{fij}$);

selecting M×M pixels of the color filter array, wherein the M×M pixels of the color filter array cover at least two red pixels, at least two green pixels, at least two blue pixels, and a target pixel, and the target pixel is a center pixel of the M×M pixels of the color filter array; and calculating a red-color contribution ($R_{average}$) from the at least two red pixels to the target pixel in the M×M pixels of the color filter array by using the distance factors of the M×M distance factor table and measured pixel information ($R_{ij}$) of each of the at least two red pixels.

2. The method of claim 1, further comprising calculating a red-color pixel performance ($f_{Rij}$) of the target pixel.

3. The method of claim 2, further comprising calculating a red-color correcting factor ($T_R$) that is a ratio of the red-color pixel performance ($f_{Rij}$) to the red-color contribution ($R_{average}$).

4. The method of claim 3, further comprising obtaining a corrected pixel information ($R_{final}$) of each of the at least two red pixels, by applying the red-color correcting factor ($T_R$) to the measured pixel information ($R_{ij}$) of each of the at least two red pixels.

5. The method of claim 3, wherein the corrected pixel information ($R_{final}$) of each of the at least two red pixels is a multiplication of the measured pixel information ($R_{ij}$) of each of the at least two red pixels and the red-color correcting factor ($T_R$).

6. The method of claim 2, wherein the red-color pixel performance ($f_{Rij}$) of the target pixel is calculated based on based on the red-color contribution ($_{Raverage}$) and measured pixel information (W) of the target pixel.

7. The method of claim 2, wherein the step of calculating the red-color contribution ($R_{average}$) from the at least two red pixels to the target pixel includes:

(a) assigning the M×M distance factor table to second M×M pixels of the color filter array, wherein one of the at least two red pixels corresponds to a central distance factor that is located at the center of the M×M distance factor table, and the target pixel corresponds to a distance factor in the M×M distance factor table based on a relative location of the target pixel to the one of the at least two red pixels;

(b) multiplying the measured pixel information ($R_1$) of the one of the at least two red pixels with the distance factor corresponding to the target pixel;

repeating the steps (a) and (b) for each of the at least two red pixels; and calculating the red-color contribution ($_{Raverage}$) from the at least two red pixels to the target pixel as a ratio of A to B, where A is a sum of the step (b) for each of the at least two red pixels, and B is a sum of the distance factor ($d_{fij}$) of the target pixel in each of the repeated steps (a).

8. The method of claim 7, wherein the central distance factor has a highest value among the distance factors in the M×M distance factor table, and the farther a distance factor in the M×M distance factor table is located away from the central distance factor, the lower a value of the distance factor in the M×M distance factor table.

9. The method of claim 2, wherein the step of calculating the red-color contribution ($R_{average}$) from the at least two red pixels to the target pixel includes:

(a) assigning the M×M distance factor table to the M×M pixels of the color filter array, wherein the target pixel corresponds to a central distance factor that is located at the center of the M×M distance factor table, and the at least two red pixels respectively correspond to two distance factors in the M×M distance factor table based on relative locations of the at least two red pixels to the target pixel;

(b) multiplying the measured pixel information ($R_{vij}$) of each of the at least two red pixels with a corresponding one of the two distance factors in the MxM distance factor table; and calculating the red-color contribution ($R_{average}$) from the at least two red pixels to the target pixel as a ratio of A to B, where A is a sum of the step (b) for each of the at least two red pixels, and B is a sum of the distance factor ($d_{fij}$) of each of the at least two red pixels.

10. The method of claim 9, wherein the central distance factor has a highest value among the distance factors in the M×M distance factor table, and the farther a distance factor in the M×M distance factor table is located away from the central distance factor, the lower a value of the distance factor in the M×M distance factor table.

11. The method of claim 1, further comprising calculating a green-color contribution ($G_{average}$) from the at least two green pixels to the target pixel in the M×M pixels of the color filter array by using the distance factors of the M×M distance factor table and measured pixel information ($G_{ij}$) of each of the at least two green pixels.

12. The method of claim 1, further comprising calculating a blue-color contribution ($B_{average}$) from the at least two blue pixels to the target pixel in the M×M pixels of the color filter array by using the distance factors of the M×M distance factor table and measured pixel information ($B_{ij}$) of each of the at least two blue pixels.

13. A method for correcting pixel information of color pixels on a color filter array of an image sensor, the color filter array including a plurality of pixel arrays, each pixel array consisting of a four (4) N×N pixel units, N being an integer equal to or larger than 2, each N×N pixel unit having a plurality of white pixels and at least one color pixel, the at least one color pixel including one or more red pixels, one or more green pixels, one or more blue pixels, or any combination thereof, the number of the at least one color pixel in each of the four (4) N×N pixel units being the same, the number of the at least one color pixel in each of the four (4) N×N pixel units being smaller than the number of the plurality of white pixels in each of the four (4) N×N pixel units, the method comprising:

establishing an M×M distance factor table having M×M distance factors ($d_{fij}$);

selecting M×M pixels of the color filter array, wherein the M×M pixels of the color filter array cover at least two red pixels, at least two green pixels, at least two blue pixels, and a target pixel, and the target pixel is a center pixel of the M×M pixels of the color filter array; and calculating a green-color contribution ($G_{average}$) from the at least two green pixels to the target pixel in the M×M pixels of the color filter array by using the distance factors of the M×M distance factor table and measured pixel information ($G_{ij}$) of each of the at least two green pixels.

14. The method of claim 13, further comprising:
calculating a green-color pixel performance ($f_{Gij}$) of the target pixel; and
calculating a green-color correcting factor ($T_G$) that is a ratio of the green-color pixel performance ($f_{Gij}$) to the green-color contribution ($G_{average}$).

15. The method of claim 13, further comprising obtaining a corrected pixel information ($G_{final}$) of each of the at least two green pixels, by applying the green-color correcting factor ($T_G$) to the measured pixel information ($G_{ij}$) of each of the at least two green pixels.

16. The method of claim 13, further comprising:
calculating a red-color contribution ($R_{average}$) from the at least two red pixels to the target pixel in the M×M pixels of the color filter array by using the distance factors of the M×M distance factor table and measured pixel information ($R_{ij}$) of each of the at least two red pixels; and
a blue-color contribution ($B_{average}$) from the at least two blue pixels to the target pixel in the M×M pixels of the color filter array by using the distance factors of the M×M distance factor table and measured pixel information ($B_{ij}$) of each of the at least two blue pixels.

17. A method for correcting pixel information of color pixels on a color filter array of an image sensor, the color filter array including a plurality of pixel arrays, each pixel array consisting of a four (4) N×N pixel units, N being an integer equal to or larger than 2, each N×N pixel unit having a plurality of white pixels and at least one color pixel, the at least one color pixel including one or more red pixels, one or more green pixels, one or more blue pixels, or any combination thereof, the number of the at least one color pixel in each of the four (4) N×N pixel units being the same, the number of the at least one color pixel in each of the four (4) N×N pixel units being smaller than the number of the plurality of white pixels in each of the four (4) N×N pixel units, the method comprising:

establishing an M×M distance factor table having M×M distance factors ($d_{fij}$);

selecting M×M pixels of the color filter array, wherein the M×M pixels of the color filter array cover at least two red pixels, at least two green pixels, at least two blue pixels, and a target pixel, and the target pixel is a center pixel of the M×M pixels of the color filter array; and calculating a blue-color contribution ($B_{average}$) from the at least two blue pixels to the target pixel in the MxM pixels of the color filter array by using the distance factors of the M×M distance factor table and measured pixel information ($B_{ij}$) of each of the at least two blue pixels.

18. The method of claim 17, further comprising calculating a blue-color pixel performance ($f_{Bij}$) of the target pixel.

19. The method of claim 18, further comprising calculating a blue-color correcting factor ($T_B$) that is a ratio of the blue-color pixel performance ($f_{Bij}$) to the blue-color contribution ($B_{average}$).

20. The method of claim 19, further comprising obtaining a corrected pixel information ($B_{final}$) of each of the at least two blue pixels, by applying the blue-color correcting factor ($T_B$) to the measured pixel information ($B_{ij}$) of each of the at least two blue pixels.

* * * * *